United States Patent
Wilson

(10) Patent No.: US 7,877,365 B2
(45) Date of Patent: Jan. 25, 2011

(54) DOCUMENT INTEGRITY VERIFICATION PREPARATION

(76) Inventor: Kelce S Wilson, 1205 Terrace Mill Dr., Murphy, TX (US) 75094

( * ) Notice: Subject to any disclaimer, the term of this patent is extended or adjusted under 35 U.S.C. 154(b) by 0 days.

(21) Appl. No.: 12/637,748

(22) Filed: Dec. 15, 2009

(65) Prior Publication Data

US 2010/0095128 A1     Apr. 15, 2010

Related U.S. Application Data

(63) Continuation of application No. 12/053,560, filed on Mar. 22, 2008, now Pat. No. 7,676,501.

(51) Int. Cl.
*G06F 7/00* (2006.01)
(52) U.S. Cl. ........................ 707/694
(58) Field of Classification Search ........ 707/694
See application file for complete search history.

(56) References Cited

U.S. PATENT DOCUMENTS

| | | |
|---|---|---|
| 6,233,340 B1 | 5/2001 | Sandru |
| 6,549,624 B1 | 4/2003 | Sandru |
| 6,792,110 B2 | 9/2004 | Sandru |
| 2002/0169971 A1* | 11/2002 | Asano et al. ............. 713/193 |
| 2003/0023847 A1* | 1/2003 | Ishibashi et al. ......... 713/169 |
| 2003/0130032 A1* | 7/2003 | Martinek et al. .......... 463/29 |
| 2003/0145206 A1* | 7/2003 | Wolosewicz et al. ..... 713/176 |
| 2004/0080777 A1 | 4/2004 | Smith |
| 2008/0091954 A1 | 4/2008 | Morris |

\* cited by examiner

*Primary Examiner*—Charles Rones
*Assistant Examiner*—Fazlul Quader
(74) *Attorney, Agent, or Firm*—Kelce S. Wilson

(57) ABSTRACT

A system and method are disclosed for rendering published documents tamper evident. Embodiments render classes of documents tamper evident with cryptographic level security or detect tampering, where such security was previously unavailable, for example, documents printed using common printers without special paper or ink. Embodiments enable proving the date of document content without the need for expensive third party archival, including documents held, since their creation, entirely in secrecy or in untrustworthy environments, such as on easily-altered, publicly-accessible internet sites. Embodiments can extend, by many years, the useful life of currently-trusted integrity verification algorithms, such as hash functions, even when applied to binary executable files. Embodiments can efficiently identify whether multiple document versions are substantially similar, even if they are not identical, thus potentially reducing storage space requirements.

20 Claims, 15 Drawing Sheets

DOCUMENT INTEGRITY VERIFICATION PREPARATION

CROSS REFERENCE TO RELATED APPLICATIONS

This is a continuation of U.S. patent application Ser. No. 12/053,560, filed Mar. 22, 2008 now U.S. Pat. No. 7,676,501, titled "Document Integrity Verification", and claims priority thereto.

TECHNICAL FIELD

The invention relates generally to information assurance. More particularly, and not by way of any limitation, the present application relates to integrity verification of printed documents.

BACKGROUND

Documents have long been subject to tampering and forgery, such as when multi-page documents are subjected to page substitution. In a multi-page document with a signature appearing on fewer than all of the pages, a potential forger may be able to create one or more pages that appear to belong in the document, but yet have different content than is contained in the original pages. The forger may then remove one or more valid pages and substitute the newly-created ones. For example, in a multi-page will, where the testator and notary sign only on the final page, a forger may substitute one of the previous pages with one containing plausible, yet different content. The movie Changing Lanes, released in 2002, demonstrates the concept of forgery by page substitution, although in that story line the document content was not changed, but merely reformatted to be associated with a signature page from a different original document. The forged document was then submitted to a court by an unethical attorney, as a piece of evidence.

Some efforts to combat document tampering include having the signer initial each page and drafting the document such that sentences span page breaks. However, neither method provides complete security. Many forgers are able to falsely generate initials easily, generally more easily than forging entire signatures. Widespread acceptance of photocopied versions of documents opens forgery to an even wider set of people lacking talent for duplicating signatures, since a small cut-out from a valid page containing the signer's initials on an intermediate page may be attached to a forged page prior to photocopying. Spanning sentences across page breaks merely requires that the forged content on the substituted page take up approximately the same printed space as the valid content that is replaced.

A drastic solution of notarizing each page individually may not be practical. Further, notarizing each page merely indicates that each page had been signed by the proper person, but without further measures, notarizing each page may not ensure that all the pages were necessarily intended to belong to the same document. That is, pages of different documents, even if all individually notarized, could potentially be combined to produce a new document that the author did not intend to endorse as a single, complete document.

There has thus been a long-felt need for a system and method for rendering printed documents tamper evident, such that tampering and forgery may be easily detected. However, there has been a failure by others to solve the problem without requiring special inks and/or paper or the use of secret information not available to an independent reviewer of the document. If an obvious, workable solution were available, authors of important documents, such as wills and other documents presenting attractive targets for forgery, would likely have already adopted a solution in order to mitigate risk, thus freeing the signer from the tedium of signing or initialing each page of a long, multi-page document and other document generators from the need for using expensive printing materials.

Solutions do exist for rendering digital computer files, such as electronic document files, tamper evident. These computer-oriented solutions predominantly use hash functions or other integrity verification functions. A hash function, which is an example of a one-way integrity verification function, provides a way to verify that a computer file, such as a program, data file or electronic document, has not changed between two separate times that the file has been hashed. One-way integrity functions generally perform one-way mathematical operations on a digital computer file in order to generate an integrity verification code (IVC), such as a hash value or message digest. This value may then be stored for later reference and comparison with a subsequently calculated IVC, but is generally insufficient to enable determination of the file contents. A difference between two IVCs may then provide an indication that the file contents had been altered between the calculations. Hash functions are currently widely-used in electronic signatures, for example in pretty good privacy (PGP) electronic signatures, in order to render digitally signed files tamper evident.

For example, if a file is created and hashed, anyone receiving a copy of that file at a later time may use a hash function and compare the resulting second hash value against the first hash value. For this to method to identify tampering, the same hash function must be used both times, and the person comparing the hash values may insist on receiving the first hash value through some other delivery channel than the one through which the file to be verified was received. One way to do this would be for an author of a digital file to hash the file, store the result, and mail the file to a receiving party on a computer readable medium such as optical media, including a compact disk (CD) or a digital versatile disk (DVD) or magnetic media, or non-volatile random access memory (RAM). The receiving party hashes the file, stores the result, and waits for a telephone call from the author to discuss the two hash values. If, during transit, the media had been intercepted and substituted with one containing an altered file, the telephone conversation discussing the hash values would reveal that the received file was different than the one sent.

Secure hash functions, such as MD5, secure hash algorithm 1 (SHA-1) and SHA-2 family of hash functions, including SHA-224, SHA-256, SHA-384 and SHA 512, have certain desirable attributes. For example, they are one-way, the chances of a collision are low, and the hash value changes drastically for even minor file alterations. The one-way feature means that it is exceptionally unlikely that the contents of a file could be recreated using only the hash value. The low chance of a collision means that it is unlikely that two different files could produce the same value. Drastic changes in the hash value, for even minor alterations, make any alteration, even the slightest, easily detectable.

This final feature has significant consequences when attempting to use hash functions to verify the integrity of printed documents. For example, an author may type "a b c" as the entirety of an electronic document file and then hash it. If the file were merely ASCII text, that is, it was not a proprietary word processor file, it could contain ASCII values {97 32 98 32 99} in decimal, which would be {0x61 0x20 0x62 0x20 0x63} in hexadecimal (hex). The message digest using the SHA-1 would then be {0xA9993A36 0x4706816A 0xBA3E2571 0x7850C26C 0x9CD0D89D}.

However, the printed version of the document would not reliably indicate whether the letters were separated by simple spaces or hard tabs. For example, another author may type "a[Tab]b[Tab]c" as an electronic document file which, if it were a simple ASCII text file instead of a word-processing file, would contain ASCII values {97 9 98 9 99} in decimal and {0x61 0x09 0x62 0x09 0x63} in hex. Based on the horizontal spacing of the [Tab] during printing, the two example documents might be indistinguishable in printed form. The message digest of the tabbed file using the SHA-1 would be {0x816EBDB3 0xE5E1d603 0x41402A18 0x09E2F409 0xD53C3742}. This is a drastically altered value for differences that may have no significance regarding the substantive content or the intended plain-language meaning.

A printed document that is scanned by an optical character recognition (OCR) system, or even carefully retyped by a second person, can be expected to fail verification with standard hash algorithms when the hash value of the recreated file is compared against the hash value of an electronic file originally used in the creation of the document. This can happen even if the document is recreated exactly word-for-word, because printing is a lossy process. That is, unprinted information, such as formatting commands, metadata and embedded data, is included in the hash value of the original electronic document file, but is entirely unknown when converting a printed version of the document back into another electronic file that can be hashed.

Even if a file is distributed electronically, the presence of formatting commands and a proprietary file format may still present a problem. For example, if a document is hashed, and then scrubbed to remove metadata or other data, the hash value will be different, even if the substantive content is not altered. Or possibly, a file could be opened without the content being altered, but the metadata might change to reflect that the document had been accessed. In such a case, a standard hash function would be useless for detecting changes to the document content, because the hash value can be expected to be significantly different, even if not a single change were made to the printed portion of the document.

Using a standard hash algorithm, therefore, would be useless when only a printed version of a document is available, because the hash value verification would be expected to fail, even if the printed document was completely intact and free from any changes. Thus, despite the long-felt need for a system and method for rendering printed documents tamper evident, even widespread use of highly-secure digital file integrity verification systems has not yet produced a solution for documents printed on paper. The systems and methods widely used for digital files are simply inapplicable to printed documents, and prior art systems and methods fail to address the problem, even partially.

Unfortunately, a problem exists even for the use of hash functions with computer files. Recent advances in computational capability have created the possibility that collisions may be found for hash algorithms that are trusted today. For example, the SHA-1 produces a 160-bit message digest as the hash value, no matter what the length of the hashed file may be. Thus, the SHA-1 has a vulnerability, which is shared by all hash algorithms that produce a fixed-length message digest.

If a first set of changes is made to a file, a second set of changes, if determinable, may be made to compensate for the first set of changes, such that a hash value calculated after both sets of changes are made is identical to the hash value calculated prior to any changes being made. This renders the use of the hash function unable to identify the alteration.

There is, however, a requirement for exploiting this vulnerability: The altered file needs to contain enough bits to include both the first set of changes and a second set of compensating changes. The theoretical limit for the maximum number of bits necessarily affected by the second set of changes is the length of the message digest, although in practice, a second set may be found in some situations that requires fewer than this number. For the SHA-1, the second set of changes does not need to exceed 160 bits in order to force the SHA-1 to return any desired value, such as the pre-tampered value. 160 bits is not a large number, and is far exceeded by unused space in typical word processing, audio, video and executable files. Therefore, if a file is hashed with the SHA-1 to determine an original hash value, and a first set of changes is then made, a second set of changes is possible that will cause the SHA-1 to return the same message digest as the original message digest for the unaltered file. Thus, the second set of changes is a compensating set, because it compensates for the first set of changes by rendering the SHA-1 blind to the alterations. The second set of changes may include appending bits to the file, changing bits within the file, or a combination of the two. The compensating set of changes, however, may affect a set of bits larger than the message digest, and in some cases, this may ease the computational burden and/or make the compensating set of changes harder to detect.

There are two typical prior art responses to the suggestion of this vulnerability: The first is that the SHA-1 and other hash algorithms have been specifically designed to make calculation of a compensating set of changes computationally infeasible. However, due to advances in computational power and widespread study of hash algorithms, such calculations may not remain computationally infeasible indefinitely. A secondary response is that the compensating set of changes should be easily detectable, because they may introduce patterns or other features that do not comport with the remainder of the file.

Unfortunately, though, the secondary assumption, even if true, is not entirely useful. This is because a primary use of hash functions is for integrity verification of computer files intended for computer execution and as data sets for other programs. Both types of files typically use predetermined formats that contain plenty of surplus capacity for concealing the compensating set of changes. For example, executable programs typically contain slack space, which are regions of no instructions or data. Slack space is common, and occurs when a software compiler reserves space for data or instructions, but does not use the reserved space. Often slack space is jumped over during execution. Thus, changes made to some sections of slack space, including the introduction of arbitrary bits, may not affect execution, and therefore will remain undetectable.

A software program may potentially be altered using a first set of changes to the executable instructions, such as adding virus-type behavior or other malicious logic, and a compensating set of changes may be made in the slack space. The compensating set of changes renders the first set of changes undetectable to the hash algorithm, while the compensating set itself remains undetectable because it is in the slack space, and is neither executed nor operated on to produce anomalous results. A covertly altered program may therefore be run, mistakenly trusted by the user, because it produces the correct hash value but does not exhibit any blatantly anomalous behavior.

Similarly, word processing, audio and video files typically have surplus capacity that exceeds the minimum needed for human understanding of their contents. For example, proprietary word processing files, such as *.DOC files, contain fields for metadata, formatting commands, and other information that is typically not viewed or viewable by a human during editing or printing. This surplus capacity often exceeds the message digest length of even the currently-trusted set of hash functions. Thus, a first set of changes could be made to the portion of the file having content that is to be printed, heard or viewed, while the compensating set of changes could be made within the surplus capacity.

Another issue, which could use improvement, is version control of documents for reducing wasted space in file systems on storage media. During the course of computer usage, multiple identical copies of some files may be stored on a file storage system in different logical directories. When backing up, compressing, or otherwise maintaining the storage system, such as copying a hard drive to optical media or purging unneeded files, it may be desirable to avoid copying or retaining duplicate files that waste media space.

For example, if a computer user faces the prospect of running out of storage space, the user may wish to delete duplicates of large files. If a single file is present in many directories, a user may create a search that spans the multiple directories, and look through the resulting list for duplicated names and dates. If storage space is low, it may be preferable to copy or retain only one of the files. Unfortunately, such a plan suffers from multiple challenges, including search time for duplicates, and missed opportunities for using shortcuts. Further, if two files having identical content, but different names, and which were put on the storage medium at different times, common name and date search methods would not identify them as identical. Thus, storage space would be unnecessarily wasted.

SUMMARY

By creating a system that violates a fundamental rule of common integrity verification systems, the expected failure verification for a printed document can be prevented, thereby reducing false alarms to a level which enables tamper detection of printed documents. Printed documents may now be rendered tamper evident with cryptographically strong methods such as hash functions. Verifying the integrity of printed documents, by using an embodiment of the invention, requires operating entirely outside the standard paradigm of digital security: A predefined subset of document elements, which may be expected to be undeterminable from a printed version of a document, are excluded from the initial calculation of an integrity verification code (IVC) while the document is in electronic form. For example, metadata, tabs, spaces, special characters, formatting commands, and the like, may be excluded from a hash value calculation. Upon a later recreation of a second digital form of the document, for example by scanning or retyping the printed version of the document into a computer, a subset of document elements is excluded from the second calculation of an IVC. Thus, even if the first and second digital forms of the document are different, if only a common subset of document elements, such as printed characters, are used in the calculations of the IVCs, a match may be expected when the printed version of the document has not been altered.

Printed and imaged documents may now be rendered tamper evident, at least with regard to substantive content. Risks of some non-literal document changes, such as font, spacing, alignment, and other formatting commands, may need to be tolerated. However, a degree of content verification is now possible for printed documents that had not previously been available. Additionally, near duplicate files may be found rapidly, by comparing IVCs of substantive content, which ignore unimportant changes. Further, hash function reliability may be improved by eliminating hiding locations for compensating changes in the event that an electronic document, or digital file, is tampered and the tampering is compensated for.

Excluding certain portions of a digital file from a hash value calculation removes hiding places for compensating changes, thereby either rendering tampering evident, or forcing the compensating changes into a predetermined portion of the file. This may enable detection of the compensating changes by other methods, such as a human reading of printed characters, or execution of central processing unit (CPU) instructions. Embodiments tolerate changes to a file, using a deterministic rule set for selecting regions for which changes are to be tolerated. This currently goes directly against the prevailing paradigm of hash function usage, because omitting sections from integrity verification is an invitation to tamper the omitted sections. The prevailing paradigm emphasizes the detection of any changes at all to a file. Effectively, this proposition is fundamentally at odds with current implementations of hash function security protocols, although a layered IVC approach, in which multiple IVCs are calculated, some covering an entire digital file, and others covering only content-dictated portions, such as by omitting slack space, can provide not only full file protection, but superior protection over the prior art single-layer hash function calculations.

Embodiments hash only a subset of the characters of an electronic file or document. Some embodiments may only hash printable characters, whose presence and order can be determined with certainty from a printed version. For example, ASCII codes, such as from 33 to 94 and 97 to 126 are the computer representation of most printable letters, punctuation, and numbers in the English language. Characters, formatting commands, metadata, and other elements of a first electronic document that cannot be exactly reproduced by manually retyping a printed version of the first document into a second electronic document are excluded from the hash function in some embodiments, in order to prevent ambiguity when a recreated electronic document is hashed. The use of only printed characters in some embodiments, and the exclusion of uncertain characters and other file content that is lost during printing, allows reliable recreation of a hash value from a printed version of a document.

Embodiments may hash only a subset of the characters of a file, and apply a consistent rule for other characters. For example, all separations between characters, such as spaces and tabs, may be represented by a pre-selected character, such as a single space, even where multiple spaces may possibly be ascertainable. Embodiments exclude at least a portion of unprinted content, such as metadata, or other data that may be unrelated to the substantive content of the document.

Aspects of the invention also relate to computer communication using cryptography for purposes of data authentication and computer program modification detection by cryptography. Aspects of the invention further relate generally to database and file management and to file version management and computer media storage optimization.

The foregoing has outlined rather broadly the features and technical advantages in order that the description that follows may be better understood. Additional features and advantages will be described hereinafter which form the subject of the claims. It should be appreciated by those skilled in the art that the conception and specific embodiments disclosed may be readily utilized as a basis for modifying or designing other structures for carrying out the same purposes. It should also be realized by those skilled in the art that such equivalent constructions do not depart from the spirit and scope of the invention as set forth in the claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
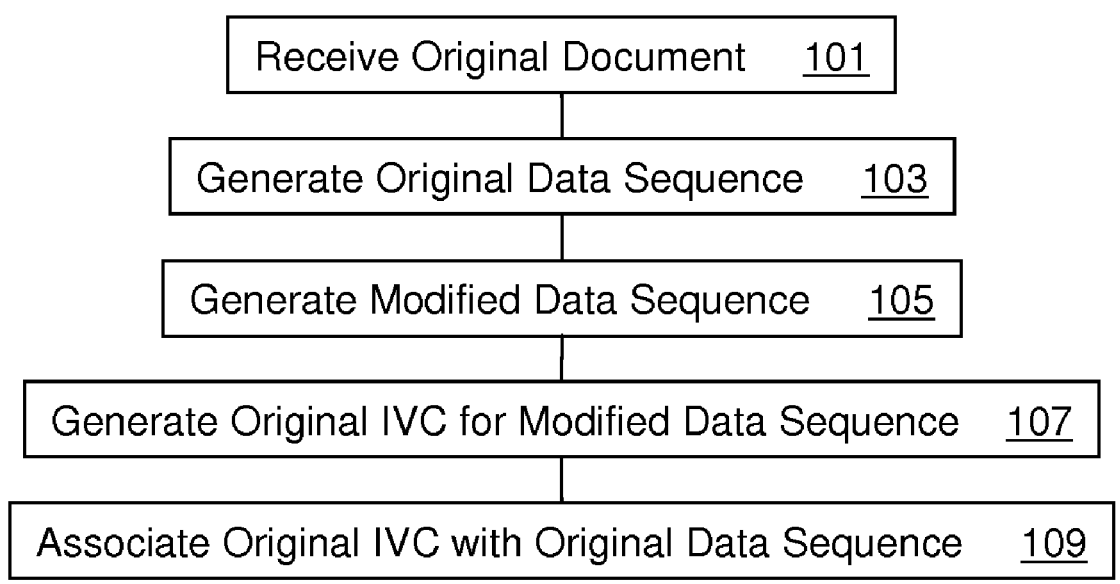
FIG. 1 illustrates a flow diagram for a method of generating an integrity verification code (IVC) for a document.

Terms are often used incorrectly in the information assurance field, particularly with regard to tamper detection. For example, the term "tamper proof" is often used incorrectly. A tamper proof article is effectively impervious to tampering, which is often described as unauthorized alteration. Few articles qualify for such a designation. "Tamper resistant" is also often used incorrectly when a more appropriate proper term would be "tamper evident". A tamper resistant article is one for which an act of tampering is difficult, although possible, to accomplish. A tamper evident article is one for which tampering is detectable, independent of whether the tampering itself is easy or difficult to accomplish.

Multiple types of documents may benefit from being rendered tamper evident, including those printed on paper, etched, or otherwise rendered on any medium. Digital document images, for example PDF documents and/or other digital files stored in an image-based and/or pixilated format, may also be rendered tamper evident, at least with regard to substantive content of the digitally-renderable images.

According to the prior art paradigm of document integrity verification, there are three states of a scanned document. State 1 is the original electronic rendering. State 2 is the printed version, which is missing information relative to State 1. State 3 is the recreated electronic version, created by scanning the State 2 version. State 3 has extra information, much of which is error prone and potentially random, when predicted at the time of creation of the State 1 version of the document. States 1 and 3 are almost certainly different, and thus cannot be tested by the same integrity verification function in order to ascertain the integrity of the State 2 version. A new paradigm adds the following: There exists a fourth state, State 4 of the document, which can be derived from State 3 by eliminating all of the potentially erroneous information added by the transition from State 2 to State 3, as well as a safety margin of sacrificial material. State 4 is also derivable from State 1, which can be identified as State 4-prime. Therefore, the integrity verification process can be performed to compare State 4 against State 4-prime, which can be a reliable comparison, in order to infer the integrity of State 2, within a predetermined tolerance that allows for some variation.

The exclusion of elements of a digital computer file from a hash value calculation process runs counter to the current paradigm for the use of hash functions. The current use for hash functions is for detecting any change at all to a file, no matter how small the change may be. Excluding elements from hashing prevents detection of many forms of alteration, and for the traditional uses of hash functions in computer security, such a result is unacceptable. This is because hash functions such as the MD5, secure hash algorithm 1 (SHA-1) and SHA-2 family of hash functions, and cyclic redundancy checks (CRCs), are often used for virus detection and tamper detection. Excluding metadata in a word processing file from a hash value could enable malicious software to inhabit the file or allow someone to access and edit the file without detection. Thus, current implementations for hashing computer files for tamper detection typically include all of the bits in a file, whether printed or not for word processing files, and whether operated upon or not for binary executable files.

Embodiments allow verification that a multi-page printed document has not been subjected to page substitution forgery by enabling reliable integrity verification of the substantive document content. This is accomplished by excluding sources of expected false alarms, such as unprinted and/or ambiguous information, that could render a traditional hash function integrity check useless. In operation, a document author could hash a document in accordance with an embodiment of the invention and print the hash value on each page of the document. A later reader of the document could perform an optical character recognition (OCR) procedure on the printed document to produce a recreated electronic version, hash the recreated electronic version in accordance with an embodiment of the invention, and compare the printed hash value with the hash value for the recreated electronic version.

Prior art hash functions would not be useful in such a manner, since the two values used for comparison would almost certainly be different. However, embodiments of the invention could enable a reliable comparison without the likelihood of a false alarm that would result from using a traditional hash paradigm.

FIG. 1 illustrates a flow diagram for a method 100 of generating an integrity verification code (IVC) for a document. Method 100 may be performed with any electronic document, whether intended to be printed, etched, rendered on any permanent or semi-permanent medium, saved in a graphical image or common publishing format, saved in a printer-ready file, presented in a humanly-viewable format on a display, used as a data source by a computing device, or used to furnish computer-executable instructions to a computing device. In block 101, an original document is received, either in electronic format as a digital representation, possibly through an electronic message communication, a facsimile or on a computer readable medium such as a magnetic or optical storage device or volatile or non-volatile memory, or in a non-electric format, such as printed or etched.

In block 103, an original data sequence is generated to represent the contents of the original document. In some embodiments, the data sequence is generated by scanning a document and performing an optical character recognition (OCR) process, in other embodiments, the data sequence could be generated by retyping a document received in a printed format, in other embodiments, the data sequence could be generated by reading a document from a computer readable medium, and in other embodiments, the original data sequence could represent the contents of an electronic document, i.e., a digital representation of a document, which is already in a computer memory. In some embodiments, if an electronic document contains elements in a class of elements that will be excluded from the later-generated modified data sequence, the original data sequence will be the subset of document elements beginning and ending with elements that will remain unmodified in the modified data sequence. In some embodiments, generating the original data sequence includes determining the file type and parsing or processing the document for type-relevant content. For example, a word processing document may be parsed to distinguish between metadata and user-editable content that is to appear in a printed or published version of the document. In some embodiments, content of document and footers, even if editable by a user, are excluded from the original data sequence. A binary executable file may be parsed and/or analyzed by a software analysis tool, such as a disassembler, that distinguishes between data-only sections and sections containing executable instructions. In some embodiments, generating the original data sequence comprises identifying the entire digital file, whereas in other embodiments, generating the original data sequence comprises selecting a portion, less than all, of the digital file, which contains selected type-specific elements such as printed characters or machine language instructions.

In block 105, a modified data sequence is generated with a lossy process, by excluding certain elements within the original data sequence, i.e., at least one element between the first and last element of the original data sequence is omitted or substituted when generating the modified data sequence. The lossy process for printed documents is intended to exclude any elements in the original document which cannot be ascertained with certainty. The processes used in block 105 are selected such that the output from block 105 will be the same as the output from equivalent processes used later. In general, the modified data sequence will be shorter than the original data sequence, but in any case, will have at least one element that is different, either by substitution or omission. In some embodiments, capitalization information may further be discarded, for example, lower case characters in the original data sequence may be made upper case in the modified data sequence. Such modification is lossy, because the original data sequence cannot be regenerated from the modified data sequence. Lossy modification prior to integrity verification works against the prevailing paradigm of integrity verification, because changes can be made in the document that are undetectable.

Elements of a document includes bits and bytes needed for editing, printing, displaying, managing, and executing, including the binary representations for individual letters, punctuation, characters, spaces, tabs, line feeds, fonts, formatting, hyperlinks and more. At a higher level of abstraction, elements could include words, paragraphs, sections and chapters. A subset of the elements of a document is any collection of the elements of a document, such that there is at least one element in the document that is not in the subset. It should be noted that, while any single subset cannot make up the entire document, two or more subsets could contain all of the elements of the document.

In block 107 an IVC is generated for the modified data sequence, and in block 109, the IVC generated for the modified sequence is associated with the original data sequence. This operates outside prior art paradigms for document security, in which integrity verification is intended to allow identification of any changes to a document. The key, however, is that the rules for generating the modified data sequence from the original data sequence are deterministic, and either communicated with certainty communication or are determinable with a limited number of trials.

The IVC, therefore, is not calculated from the original data sequence, but instead from a modified data sequence, which has at least one element, between a first and final element, which is different from, or omitted from, the original data sequence. This is another violation of the prior art paradigms for document security, because in some embodiments, the IVC is calculated after internal content changes, such as substitutions and omissions, are made to a data sequence, and associated with the unmodified data sequence. Thus, in those embodiments, the IVC is not calculated using the data sequence with which it is associated. In some embodiments, associating an IVC with the original data sequence comprises inserting the IVC into the electronic document from which the data sequence was generated. In some embodiments, associating an IVC with the original data sequence comprises inserting the data necessary from printing the IVC on the document into a printer data stream or publishing format file, such that the IVC appears on a hard copy printed version of the document or in the published format file.

From an information theory perspective, if the rules used to generate the modified sequence are determinable, then the modified data sequence is reproducible, and an IVC generated with the modified sequence can be used to verify the integrity of at least a portion of the information contained in the original document. The result is that, because the modification rules permit the loss of information, alterations to at least some portions of the original document may be indiscernible, if they are confined to the lost portions of the original data sequence. Thus, slightly different versions of an original data sequence could produce the exact same modified data sequence. For example, in some embodiments, a first original data sequence D1, using three spaces to indent at the beginning of a paragraph, a second original data sequence D2, using tab characters to indent at the beginning of a paragraph, and a third original data sequence D3, using formatting commands to indent at the beginning of a paragraph, could all produce identical modified data sequences if the substantive content of D1, D2 and D3 were similar enough.

In some embodiments, the rules for creating a modified data sequence could include replacing any combination of tab characters (ASCII 9) and/or series of spaces (ASCII 32) and/or other preselected character patterns in the original data sequence with a single space (ASCII 32), or omit the tabs and spaces entirely, resulting in only printable ASCII characters remaining in the modified data sequence. A space between printable characters, whether due to a space, a tab, or a combination, my be printably determinable, because the existence of a gap, i.e., a horizontal displacement exceeding the horizontal displacements between other pairs of adjacent printed characters, may be ascertained. Multiple tabs and spaces, however, are unlikely to be determinable with certainty, as are spaces and tabs at the beginning of a line, since an indention may be due to formatting commands, rather than a user-typed character. Line justification, which introduces additional spaces between words or letters, in order to cause a printed line to start and end at specified margins, can complicate efforts to determine the number of spaces between printed characters. Other issues complicating the determination of the existence of spacing characters is when a tab setting places a character close to the same location it would have been placed without a tab and column spacing in a multi-column document could be confused with spacing between words. To reduce the column spacing ambiguity, the rules for generating the modified data sequence for a document, which is to be printed for human reading in a multi-column format, may need to be processed to re-order the words as they would be interpreted by an OCR process that did not take into account the columns when creating an electronic version of the document. The combination of a carriage return and a line feed may be printably determinable, as is a page break. Printably determinable elements include printable elements, as well as elements whose existence may be determined from a printed version of a document. However, page and line break characters in a document are generally not determinable from a printed version of the document, because the word wrapping function of a word processor or other program used to generate a document introduces such elements automatically, often without the document author typing corresponding characters. Some embodiments may recognize a binary value within a printable range of ASCII characters as an unprinted formatting mark, based on the document type, such as the </p> paragraph formatting identifier in an html document. In such embodiments, the rules for generating the modified data sequence will permit identification of unprinted, or unpublished, document elements by a file parser based on reserved identifiers for certain document types, for example angle braces in html and xml documents.

In some embodiments, each element in the original data sequence will be subject to a determination of retain, omit, or modify. Retained elements pass through to the likely shorter modified data sequence. Between the first and final retained elements, at least one element will be omitted or modified. In some embodiments, the modification rules may be kept secret for a party which intends to monitor a file on a computer storage system for modification, such as for virus or hacker penetration determination. For some embodiments, custom rule sets will be communicated between a limited number of parties. For some embodiments, modification rules will be published openly.

The original IVC generated for the modified data sequence in block 107 may be an integrity verification function result, such as a hash value or a checksum, which typically has fewer bytes than the data sequence for which the IVC is generated. The hash function may be any combination of the MD5, the secure hash algorithm 1 (SHA-1), any of the secure hash algorithm 2 (SHA-2) family of functions, or any other suitable one-way function. Although blocks 103-109 are illustrated in a manner that indicates subsequent processes, it should be understood that the processes denoted by blocks 103-109 may be conducted as overlapping in time. For example, as a document is typed, a function of a word processor may send portions of the document to a parser and then a one-way function, such as a hash function, in order to continually update the current IVC displayed in the document footer, possibly along side a page number. Further, if the document is large, it may be wasteful to generate the entire modified data sequence in memory. Rather, sections of the original data sequence may be modified on an as-needed basis for the IVC generation, cycling through the processes of blocks 105 and 107, such that the processes of blocks 105 and 107 are effectively simultaneous. Hash functions typically operate on predetermined block sizes, which are often smaller than the document being hashed. For some embodiments of method 100, sections of the original data sequence may be modified in a buffer to create portions of the modified data sequence with a length that is a multiple of the hash function block size. The same buffer location in memory may be reused for subsequent portions of the document, in order to save memory usage. Thus, the entire modified data sequence may not exist in memory all at a single time if method 100 is implemented in a manner to save computer memory, but rather is generated in sections for use by the IVC generator.

Associating the original IVC with the original data sequence in block 109 can include printing a portion of the IVC on the document, such as printing a portion of a hash function value, often called a message digest, on a page relating to the original data sequence. In some embodiments, a document signer or endorser can write an IVC by hand onto the document, perhaps adjacent to initials or a signature line. Multiple IVCs can be generated for a document by using differing portions of the document, and the IVCs may be further processed before being associated with the document, such as being excerpted, encrypted, or subject to passed through a computation that can be ascertained at a later date. For example, one IVC may represent the printable or printably determinable characters of the entire document. Other IVCs may represent portions of the document, including portions defined by two points in the document, wherein the points may include the first printable portion, page breaks, and the final printable portion. In this manner, IVCs can be generated for specific pages and cumulative portions, such as from a starting point in the document to the end of a selected page and from the start of a selected page to an ending point in the document. These options are described in more detail in the descriptions of FIGS. 13-15. Other options for associating the original IVC with the original data sequence in block 109 are described below in the descriptions of FIGS. 3 and 4.

The operation of method 100 may be leveraged for multiple uses, including rendering printed documents tamper evident, improving the efficiency of computer storage mediums, extending the life of hash algorithms in the presence of increasing computational power and research intended to identify collisions for spoofing the message digest after tampering, and the enhancing time-stamping of documents in order to more easily prove their existence as of a certain date.

That is, violation of a fundamental paradigm of integrity verification functions provides for multiple exploitable, advantageous benefits.

Figure 2:
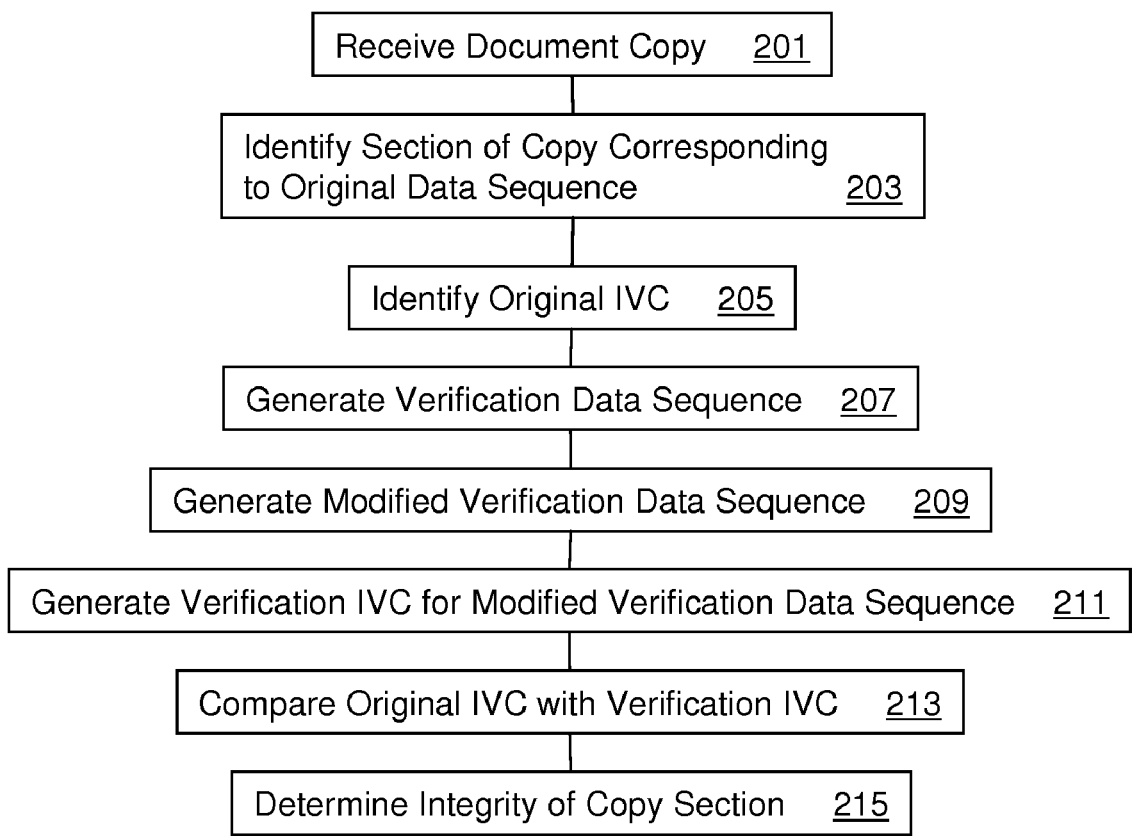
FIG. 2 illustrates a flow diagram for a method of ascertaining the integrity of a document, using an IVC generated in accordance with the method of FIG. 1.

FIG. 2 illustrates a flow diagram for a method 200 of ascertaining the integrity of a document, using an IVC generated in accordance with method 100. Methods 100 and 200 may be used with any printed, etched or otherwise published document, including digital representations of documents in image and rastered formats, for example bitmaps, jpegs and fax bitstreams, and/or a common document publishing format, for example PDF documents and their equivalents. After an embodiment of method 100 renders a document tamper evident, embodiments of method 200 identify whether tampering of a document copy has occurred. In block 201, a copy of a document is received. The document will have at least one ICV associated with it, possibly printed in a document footer, header or appendix, although the IVC may be stored externally from the document for some embodiments. If the document is only in a hard copy form, such as a printed or etched form, it may require scanning or retyping in order to be converted into an electronic format. Some documents may be received in a non-textually editable electronic format, such as a facsimile data stream, an image file, a publishing file format, or a printer file stream. The electronic version will require some form of text extraction, such as, for example, an OCR process, in order to identify the substantive content of the document. In some embodiments of method 200, formatting commands, such as font selection and indentions, are often not considered to be part of the substantive content. Documents in multi-column format may require further processing in order to recreate the proper word order after scanning.

An OCR process, as well as manual retyping, is unlikely to reproduce a character sequence that is identical to the originally-typed document, due to ambiguity over spaces versus tabs, column formatting, page margin changes, and paragraph indentions. Thus, the recreated electronic document version can be expected to differ from the original electronic document version. For prior art integrity verification methods, such expected differences are almost certain to result in a different IVC calculation for the recreated electronic document, even when the document is perfectly intact, with no changes. The high probability of false alarms renders prior art methods of integrity verification for hard copy document integrity functions effectively unusable.

However, since the original IVC (or multiple IVCs) associated with the document were created using lossy modification rules that produced a modified sequence (or sequences), the same or similar rules applied to the recreated electronic document can reproduce the same modified sequence (or sequences). This cuts down the false alarms and allows use of IVCs with hard copy documents that require recreation of electronic versions. Thus, with the proper selection of modification rules, the original electronic version and the recreated electronic version are two of the plurality of electronic versions that will produce the same set of IVCs. Tampering, or other permissible changes, which moves the document among the different versions that all will produce the same IVCs, may not be detectable within method 200, but instead may require additional testing. This is because the combination of methods 100 and 200 is intentionally blind to likely differences, arising from recreation of an electronic document from a hard copy document. This is a trade-off for enabling document integrity verification in situations in which it was previously unavailable.

In block 203, the section of the document copy is identified, which corresponds to the original data sequence being tested. In some embodiments, the identified section will exclude the document footer. If only a single IVC is provided for the entire document, the section of the copy is likely to be the entire document, minus any IVC appearing on the pages, any possibly other content of footers and headers. In some embodiments, other document portions may be excluded from the identified section, such as title pages, indexes, appendices, page numbers, inline images, or other selected contents of footers and headers. The exclusion of textual information from document headers and footers is optional, and based on the desired engineering and implementation details desired for a particular integrity verification system. This information will not need to be included in every case. For example, method 200 can be tried iteratively with differing likely rule sets, some of which include page numbers and some of which exclude page numbers. The IVCs from various trials can be used as a comparison, and if one of them matches, then the original rule set has been reverse-engineered, based on trial rule set that worked.

Some documents may have multiple IVCs corresponding to different portions of a document. For example, a document may have printed in the footer of each page an IVC corresponding to each of: the entire document, the current page, the preceding page, the following page, the cumulative portion of the document starting at the beginning and going through the end of the current page, and the cumulative portion of the document starting at the beginning of the current page and going through the end of the document. These options are described in more detail in the descriptions of FIGS. 13-15. In the event that multiple IVCs are used with a document, blocks 203 through 215 of method 200 may be repeated for as many of the IVCs on as many of the pages as is desired. In some embodiments, the position of an IVC within a document footer identifies its relevance to a portion of the document. For example, the IVC for the entire document may be listed first, followed by the IVC for the current page, followed by the IVC for the following page, although other orders may be used. In some embodiments, the formatting and number of the IVCs used may be determinable according to a published set of rules. For example, a single page document will have only a single IVC, a two page document will have three IVCs on each page, and a three or more page document will use six IVCs on each page. The IVC appearing on the page may be only a portion of the entire calculated IVC. For example, if the SHA-1 is used, the IVC printed on a document may only be the final 8 bytes of the message digest.

For purposes of describing FIG. 2, the example of a printed five page document will be used. A recipient is provided with a copy of the document and notices that six IVCs appear in the footer of each page. The first IVC on each page is identical, and corresponds to the IVC for the entire document. The recipient scans the document to produce an electronic version, thus completing block 201. The first IVC to be reproduced for integrity verification purposes is the IVC corresponding to the entire document. The entire document, possibly omitting a cover page and appendices, is identified as the section corresponding to the original IVC in block 203. In some embodiments however, the integrity test may apply to only a relatively small portion of a document. In block 205, the IVC is identified, possibly from a plurality of IVCs in a document footer, or else is provided from outside the document. In some embodiments, if an IVC had been written by hand, it IVC may be typed in by user input or subjected to a handwriting interpreter. In block 207 the recreated electronic document version is used to generate the verification sequence, such as by identifying the first and final printable characters in the OCR'd document. When the section to be tested for integrity is a single page, the process of generating the verification sequence includes identifying document elements between page breaks, whether soft or hard.

In block 209, a modified verification data sequence is generated from the verification data sequence, similar to the process used in block 105 of method 100, as shown in FIG. 1. The modification process used in block 209 is also lossy, but intended to be so, in order to match the output of the modification process used in block 105. Thus, the combination of blocks 105 and 209 enable generation of matching IVCs, even with different inputs. If the modification rules have been published or otherwise communicated, these are used. Otherwise, blocks 203 through 215 will need to be iterated with multiple guesses of the modification rule options, until a set of modification rules is found that allows recreation of a majority of individual page IVCs. However, for this current example, the document recipient is provided with a set of modification rules that would enable the recreation of the modified sequence, if the document was actually intact. In block 211, an IVC is generated for the modified verification data sequence using the same algorithm as was used in block 107 of method 100. If the specific algorithm used in method 100 is not communicated to the document recipient, several integrity verification algorithms may need to be tested. Such testing is typically more reliable using multiple single page IVCs for a multi-page document and, if the majority of them indicate the same integrity verification algorithm, that algorithm should be the one used for an integrity decision.

In block 213, the original IVC and the newly calculated IVC are compared. In some embodiments, only a portion of the original IVC is provided for comparison. In block 215, an integrity decision is made using the results of the comparison in block 213. If the IVCs for the tested section of the document match, the integrity decision is likely to pass. However, if the IVCs do not match, even after ensuring the modification rules and algorithm were selected properly, then blocks 203 through 215 may need to be repeated for individual pages.

In the event that individual pages need to be checked for the possibility that one has been substituted or altered, the IVCs of each individual page and cumulative subsections of the document may be checked in accordance with method 200. In some tampering scenarios, the tampered document may include a printing of the post-tampering IVC on each individual page, although the post-tampering IVC for the entire document will be incorrect. Thus, although the presence of tampering somewhere in the document has been detected by a document-wide IVC check, clever tampering could enable each individual page to pass an IVC check. Thus, each page of the five page example document may include IVCs that correspond to portions of the document not on that page, such as a previous or subsequent page, or include portions of the document prior to or subsequent to that page. By comparing the printed IVCs in the document footers for consistency, such as the IVC on page 3 for the subsequent page does indeed match the IVC on page 4 for the current page, tampering of the IVCs themselves may be determined.

There are at least four states of the document: original electronic, published, recreated electronic, and verifiable electronic. The verifiable electronic state is the one for which an IVC is created in both methods 100 and 200. Upon creation of the original electronic version, the exact state of a later-generated recreated electronic version typically cannot be predicted with certainty, since the OCR or retyping process will be subject to variations. Upon generation of the recreated electronic version, the state of the original electronic version will likely not be reproduced exactly, for reasons described earlier. Fortunately though, there exists a verifiable electronic version that may be generated using both the original electronic version and a later-generated recreated electronic version. That is, the same verifiable state may be reached by starting states which can be expected to have differences: the original electronic state and the recreated electronic state. The original IVC and the IVC generated for verification purposes are generated for the verifiable state. The key is that the modification rules applied to each starting state should be lossy in such a manner that each modification process, in methods 100 and 200, produces the same ending state.

Figure 3:
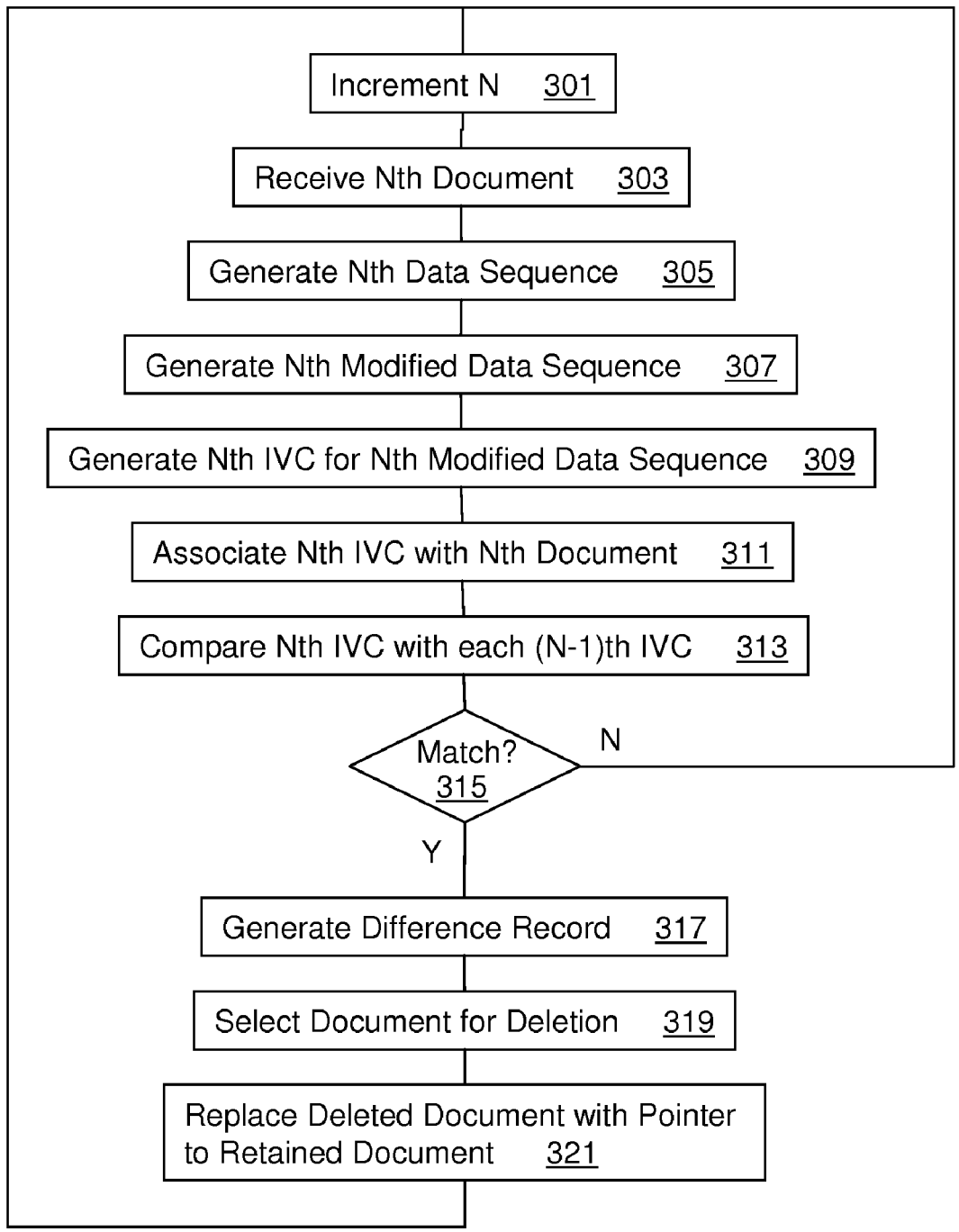
FIG. 3 illustrates a flow diagram for a method of conserving digital file storage space, using an IVC generated in accordance with the method of FIG. 1.

FIG. 3 illustrates a flow diagram for a method 300 of conserving digital file storage space, thus improving the efficiency of computer storage mediums, using an IVC generated in accordance with method 100 of FIG. 1. The utility of method 100 extends beyond the use of rendering documents tamper evident, and thus may be used for additional purposes. In some embodiments, IVCs have uses beyond detection of malicious tampering, such as for determining whether two files are substantially similar. This aids efficiency in storage and backing up files, because it enables rapid detection of similar, but not identical files.

When similar, but not identical files are detected, a file version control process can then examine the detected files and determine whether it would be preferable to keep both versions as full, separate files, or else keep one version and delete the other, or else omit it from a file system back-up. Upon deciding to delete a version, or omit it from a file system backup, a difference record and a pointer to the full file can enable later reconstruction of the missing file. The difference record can then be accessed to reconstruct the desired file if needed, such as for separate editing or processing from the referenced file. In some situations, however, some differences may be discarded. For example, formatting changes might be retained in a difference record, whereas certain metadata, such as editing times, can be disposable. Such decisions can be made by evaluating media parameters, such as free space, media access time, media reliability, and the value of the differences.

One challenge in identifying similar, but not identical, files is that comparing large files can be burdensome. As an example, consider the case of a set of 1 Mb files, which have passed an initial screening, based on similar file lengths. When searching for near duplicates among a set of N files, the number of file comparisons typically required for a brute-force search is the cumulative sum of 1 to (N−1). This can easily become a large number. So if each comparison requires operation upon two 1 Mb data sequences, the search will consume considerable resources in terms of memory and central processing unit (CPU) execution cycles.

However, if each of the comparisons uses only two 40 byte sequences, the comparison will take far fewer resources. Even fewer resources can be used if only a portion, perhaps an 8 byte portion of an IVC, is used in the initial similarity check. With prior art IVCs, two files, which are identical, except for a single, unimportant bit, will escape similarity detection. Fortunately, generating IVCs based on modified data sequences, in which less-important data is excluded from the IVC calculations, enables detection of near duplicates with the shorter sequences. Matches identified with the IVCs can then be verified, if desired, with a more comprehensive comparison. Other similarity checks can be employed, such as a length threshold check, in which only files within a certain percentage length are considered candidates for similarity. File names and dates may be used, but are often not dispositive.

Method 300 performs one or more iterations of method 100. In block 301, N is incremented from an initial value of 1, which indicates that the first document was processed in method 100. In some embodiments, blocks 303-311 are iterated versions of blocks 101-109 for each of the second and subsequent documents. In blocks 109 and 311, associating an IVC with a document does not require that the IVC be printed or published on the document. Instead, a database may be created, with records for the processed files, identifying the IVCs as associated with their corresponding documents. The database may contain file names, dates, sizes and permissions, indexed with the IVC, or even multiple IVCs, generated according to method 400, shown in FIG. 400. Because blocks 105 and 307 may use processes that exclude content based on the document type, differences between the documents that are of lesser importance may be ignored when generating a set of IVCs. In block 313, these IVCs are compared for matches. One way to do the comparison is to generate and store all IVCs first, and then go through the list, comparing each IVC against the others. Another is to compare each IVC, as it is generated, against the current list, and then append the list with the newly generated IVC. Some embodiments may skip comparing IVCs, if the file sizes are different beyond a threshold. However, comparing file sizes first, before comparing IVCs, may actually be slower than comparing small portions of the IVCs for all files, and then following up with a more comprehensive similarity check if the initial partial-IVC comparison passes. That is, in some embodiments, block 313 comprises a series of comparisons that result in an improved comparison process, such as an initial quick check that could eliminate most non-duplicates, and then further, slower checks to reduce false alarms.

Comparisons using IVCs, even a full IVC from a SHA-512 message digest, uses a significantly smaller number of bytes than a comparison of the documents themselves. Because document-dependent content exclusion rules limited the document content that was used in generating the IVCs, documents with similar substantive content can be readily identified, even when using an integrity verification function, such as a highly secure hash function, to generate the IVC. The identification process thus described may result in the identification of a match between subsequent document versions, in which important formatting changes were made and should be preserved. This is possible using method 300.

In decision block 315, if a match is detected, method 300 moves to block 317, in which differences between the corresponding files are determined. Otherwise, N is incremented in block 301 and another file is processed. In some embodiments, the difference record includes differences not only those found within the documents, but other differences pertaining to the documents, such as dates and sizes and a count of the differences. In some embodiments, the difference record is presented to a user or a document retention algorithm, for use in determining the disposition of the documents. In block 319, one of the documents is selected for retention.

Several retention policies may be implemented. For example, if multiple identical documents are discovered, or documents having disposable changes, one or two full copies may be retained intact, while the others are selected for deletion. Some directories may be excluded from the comparison, and directories may be prioritized for file retention or file deletion, such that files in specific directories are more likely to have files retained than others. For storage media compression and/or clean-up, deletion may involve actually deleting the document itself from the media index. For copying purposes, such as export and back-up, deleting may be limited to logically deleting the copy instruction from the writing process, but leaving the original file in place on the media. It should be understood, therefore, that method 300 may be invoked automatically as part of a media writing process.

In some embodiments, the retention policy may select keeping a newer file and deleting an older version, although time and date indications on many computer file systems may be inaccurate and thus not dispositive in the retention decision. In some embodiments, a human user may be presented with a summary of the difference record an asked to choose a retention option. In some embodiments, a rule-based automated system may select a previously-identified solution. In block 321, if a document has been selected for deletion, it is replaced with a pointer to the retained document, for example a shortcut file. When method 300 is used in media writing, the deletion is a deletion from the writing process, and substitution with an instruction to write the shortcut to the media, in place of the document. The difference record is stored along with the shortcut in order to facilitate recreation of the original file, with a desired set of differences. It should be understood, however, that some embodiments delete documents without generating pointers and difference records, and that some embodiments delete documents and generate pointers, but not difference records. Some embodiments may select from the multiple options, based on the document differences and/or user input. Method 300 is then available to return to block 301 and iterate until all documents identified for processing have been processed.

Figure 4:
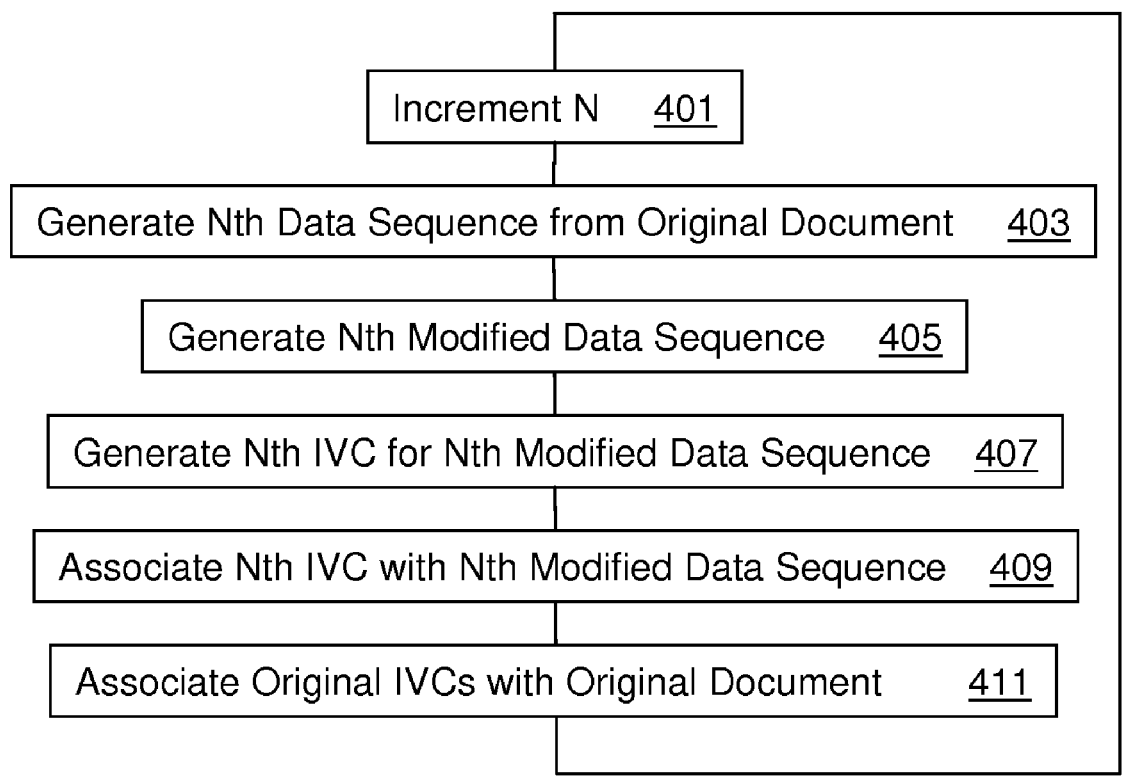
FIG. 4 illustrates a flow diagram for a method of improving the reliability of integrity verification, using an IVC generated in tandem with the method illustrated in FIG. 1.

FIG. 4 illustrates a flow diagram for a method 400 of improving the reliability of integrity verification, using an IVC generated in accordance with method 100 of FIG. 1. Method 400 is useful for extending the reliability of hash algorithms in the presence of increasing computational power and research intended to identify collisions for spoofing the message digest after tampering. Method 400 provides for layered integrity verification, using rule-based exclusion of characters within a data sequence in the calculation of additional IVCs. Similar to method 300, portions of method 400 comprise an iteration of portions of method 100. Methods 100 and 400 are used with a file known to be in a baseline state and method 500, shown in FIG. 5 and described later, is the corresponding tandem method useful for later integrity verification.

As described previously, if a document is tampered with, compensating changes could be inserted into portions of the document such that a predetermined IVC is calculated after tampering, such as the pre-tampering IVC for a specific hash function. Embodiments of methods 100, 400 and 500 eliminate the hiding places for compensating changes. A prior art IVC may be calculated, in addition to IVCs calculated in methods 100 and 400, in order to provide for integrity verification of the entire file. However, the rules for excluding portions of the document when generating further IVC layers exclude areas of the document in which compensating changes could be hidden. Content exclusion may be based on the document type, such as excluding metadata from word processing documents and slack space from binary executable files, and/or could be based on calculated values, such as using a prior-generated IVC to determine excluded bytes from subsequent IVC generation. This latter system is effectively equivalent to chaining in encryption, because the content to be protected is used as a data input for the protection process. Multiple IVCs can be generated, using increasingly shorter modified data sequences, to provide a layered protection scheme.

For example, for a document which is an executable computer program, an IVC may be generated for the entire file. If the program had been tampered with, the easiest place to hide compensating changes is within slack space, which is unused space within an executable computer program file that had been inserted by the compiler, and is not reached during program execution. Another place to hide compensating changes is in data sections which are unlikely to be used. Thus, a second IVC could be generated for the program, which excludes slack space from the IVC check, thereby denying the slack space as an available hiding place for the compensating changes. A third IVC could also be generated, excluding data sections and/or rarely-used instructions. If all three IVCs are associated with the program, then slack space and data sections, even those intermixed with legitimate CPU instructions, are unavailable as hiding places for compensating changes. The modified data sequence generation process for executable programs may require some type of control flow analysis, similar to control flow graph generation processes used in disassembling debuggers, which discriminate between instructions and data, and identify execution path possibilities by analyzing control flow jump instructions. In some embodiments, even bytes that fall within the set of legitimate CPU instructions are excluded if a control flow analysis indicates that the instructions are unreachable through likely execution paths.

The concept is that the modified data sequence, for which the IVC is generated, has multiple properties which complicate any attempts to calculate and insert compensating changes to conceal tampering in the original document. This is true even if the party performing the tampering is aware of all the modification rules. First, if the modification rules are set to exclude characters based on their value, the compensating changes must fit within a restricted character set. This can potentially increase the required length of the compensating set. Whereas before, the compensating set might have been able to use any byte values, the compensating changes must now also pass through the content exclusion and modification rules. Position-based modification rules could exclude or otherwise modify every Nth element, where N can change after each affected element. For modification rules based on element position, compensating changes, if they can even be found, must be positioned appropriately in the file in order to remain in all of the necessary layers.

Document type-based modification which, for some embodiments, retains printable or printably determinable characters for word processing documents and computer execution instructions and data for binary executable files, forces compensating changes into portions of the document in which any compensating changes are detectable by other means. For word processing documents, even if compensating changes could be found that used only printable characters, it is highly unlikely that the changes would take the form of language that fit the remainder of the document. For binary executables, even if compensating changes could be found that used only valid CPU instructions, it is highly likely that the changes would cause anomalous program behavior that would trigger suspicion.

Using methods 100, 400 and 500 in tandem, surplus file capacity, i.e., the areas of a file in which changes could reside, are placed outside a zone of trust for a particular IVC layer. That is, the documents are separated into different subsets: a portion for integrity verification and a buffer portion for which changes are tolerable, at least for the current IVC calculation layer. A portion excluded for one IVC layer, though, may have been included in a prior IVC layer, because methods 400 and 500 can be iterated. In some embodiments, the excluded portion for a specific IVC layer is effectively a sacrificial portion, intermingled with the included portion, such that the portion of the document used in the IVC generation is not fully contiguous.

Other methods are then brought into the tamper detection process, which had not been available with prior art integrity verification methods. For example, in documents intended for human understanding, the ability of a human reader to rapidly spot meaningless sequences of printed characters is harnessed, whereas before, compensating changes could have been hidden in areas of a word processing digital file never seen by a human. In documents that form binary executable files, the relatively fragile behavior of a CPU, when presented with a set of instructions and data, can be harnessed to cause a suspicion-raising crash when compensating changes are executed, whereas before the compensating changes could be hidden in areas of the file not operated upon by the CPU. For audio and video files, the additional method is human interpretation of the sound and/or images. For example, even if a set of compensating changes could be found for an audio or video file, that could return the SHA-1 hash value to a pre-altered value after changing data, it would be highly unlikely that the compensating changes would result in sounds or images that do not arouse suspicion or attract the attention of a human observer. However, if a potential saboteur had the option of hiding the compensating changes in unused space in the file, the tampering task is greatly simplified.

Method 400 performs one or more iterations of method 100. In block 401, N is incremented, which indicates that a prior layer was processed in method 100. In some embodiments, blocks 403-411 are iterated versions of blocks 101-109 for each of the further IVC layers. In block 403, the Nth data sequence is generated from the original document. In some embodiments, if each of the modified data sequences is to be generated using the same baseline data sequence, block 403 is only performed a single time, and is not necessarily updated for every iteration of method 400. In some embodiments, the modified data sequences become increasingly exclusive with higher iterations, so the data sequence resulting from block 403 or an equivalent is the previous round's modified data sequence resulting from block 405. That is, in some embodiments, the Nth data sequence is the (N−1)th modified data sequence. In block 407, the Nth IVC is generated. It should be understood that multiple IVCs can be generated for each iteration of methods 100 and 400, using different integrity verification functions, and further, that different functions can be used for different iterations. For example, method 100 can use the SHA-512, the first iteration of method 400 can use the SHA-256, and the second iteration of method 400 can use the SHA-1.

In block 409, the IVC, or multiple IVCs, generated in the Nth round are associated with the Nth modified data sequence. In some embodiments, a reference database is created of the IVCs, and either a label or the position of an IVC in the database indicates which of the N iterations produced the IVC. In some embodiments, block 409 is omitted. In some embodiments, a database listing the IVCs can be scrambled, since during a verification process, a newly generated verification IVC can be compared against all the IVCs in the reference database. In block 411, the IVCs are associated with the original document, possibly by the creation of reference database, or else by adding the IVCs to the document. It should be understood, however, that in some embodiments, blocks 109 and 411 of methods 100 and 400, respectively, are optional. It should be further understood that, in some embodiments, blocks 409 and 411 are merged.

In blocks 109 and 411, associating an IVC with a document does not require that the IVC be printed or published on the document. Instead, creating the reference database suffices, because it stores information that is used to communicate the IVCs to another party via alternative means. This addresses a security concern often arising in the use of hash function. If the document is emailed or mailed on a computer readable media with the IVCs included, a third party may intercept the document and the IVCs, tamper with the document, generate new IVCs, and then forward the altered document and new IVCs to the intended recipient. If the recipient uses the new IVCs, they will falsely enable the document to pass integrity verification. Rather, the recipient should insist on receiving the IVCs by an alternative communication channel, such that the third party cannot reliably intercept and replace them. Examples of alternative communication channels include a phone call, a separate mailing route, and even open publication in a database, on a website, or in another public forum. Open publication does not betray the contents of the original file if an IVC is generated using a one-way function, such as the SHA-1 or a SHA-2 algorithm.

The tandem combination of methods 100 and 400, and even method 100 alone, may be used with or without a prior art hash of an entire document. That is, a prior art hash value may be generated for a document, along with an IVC generated in accordance with method 100. Such a system provides a two layer integrity verification solution. Alternatively, Methods 100 could be performed alone, to provide a single layer IVC solution, but one that still denies hiding places for compensating changes. As yet another alternative, methods 100 and 400 could be performed in tandem, a prior art hash function. This would provide, at a minimum, a three layer solution, although more layers can be generated with a second and further iteration of method 400. Further alternatives could be the tandem use of methods 100 and 400 without a prior art hash function. Any of these options are usable with method 500 and the system 1700, illustrated in FIG. 17.

Figure 5:
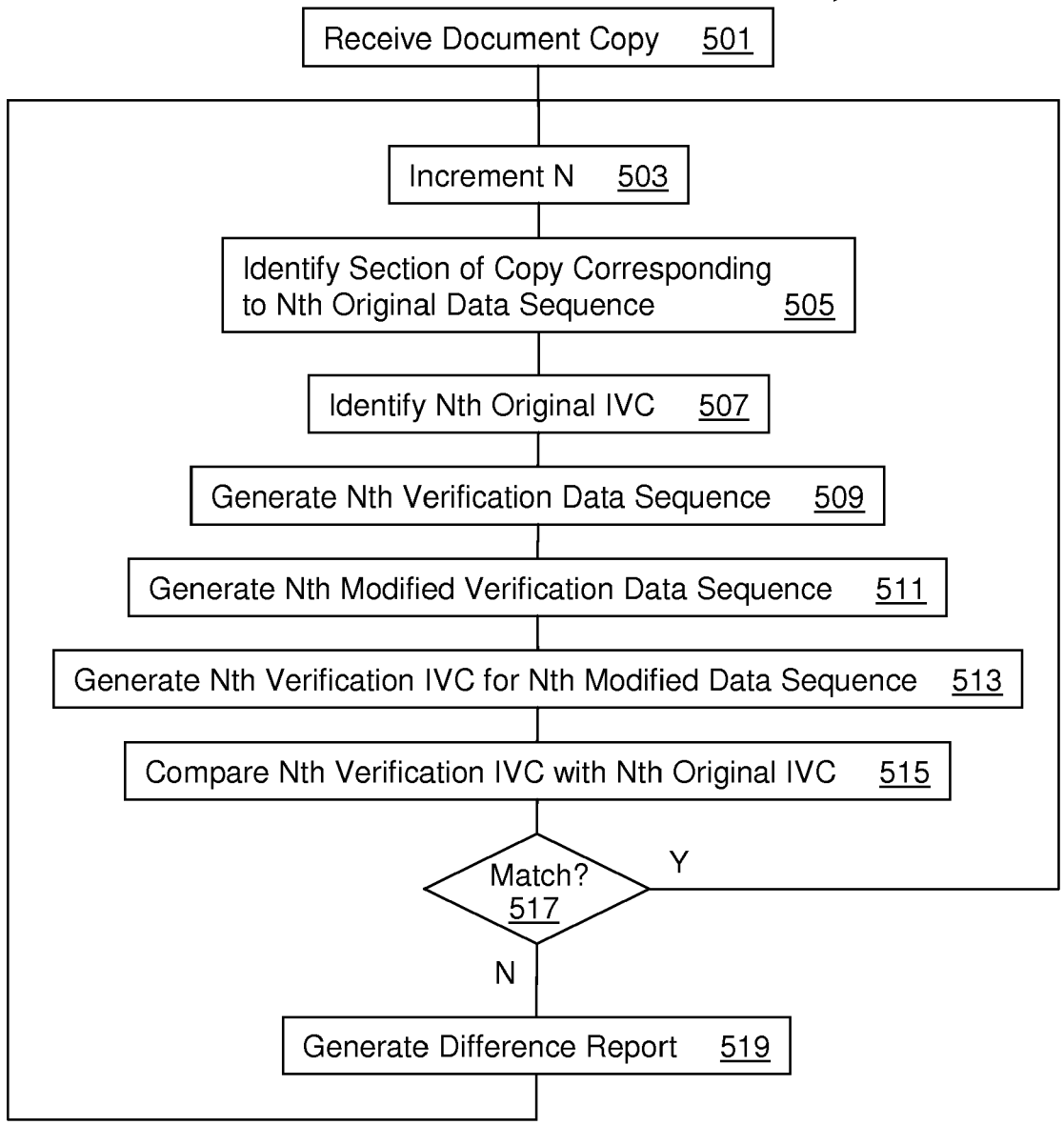
FIG. 5 illustrates a method of ascertaining tampering in tandem with methods illustrated in FIGS. 1 and 4.

FIG. 5 illustrates method 500 of ascertaining tampering in tandem with methods 100 and 400. It should be understood, however, that method 400 is optional, and method 500 can be used with method 100 alone. In block 501, a copy of a document is received. The document may be received in printed or electronic file form. If the document is received in printed or etched form, it will need to be converted to an electronic form for processing. If the document is received in a published file format, or an image format, an OCR or equivalent process will enable extraction of the text for processing. In block 503, N is incremented, in the first iteration, to a value of 1. In should be understood, however, that if only a single IVC layer was generated using a modified data sequence, block 503 is not performed. It should be further understood that the designation of N in any figure described herein is only for purposes of describing a particular iteration of a process, and should not be interpreted to require that any memory location in any processing device necessarily holds an integer value equal to that described as N during the process iteration.

In block 505, the section of the document copy is identified that corresponds to the Nth original data sequence used for generating an IVC. The section may be a page of a printed document, the entire document, or any identifiable subset of the document. In block 507, the Nth original IVC, generated using one of methods 100 or 400, is identified. In some embodiments, this can be accomplished by reading a portion of a face of the document. In some embodiments, this is accomplished by reading in a separate document. In some embodiments, such as those involving alternate communication channels for the IVCs, the IVCs may be typed in or electronically pasted into a user input window in a computer program application executing at least a portion of method 500. In block 509, a verification data sequence is generated, which corresponds to the original data sequence generated in block 103 of method 100, shown in FIG. 1 or block 403 of method 400. In some embodiments, blocks 511 and 513 are similar to blocks 103-105 and 405-407 of methods 100 and 400, respectively.

In some embodiments, block 511 uses a similar modification rule set as is used in one of blocks 103 and 403, and if the modification rules changed between different layers during methods 100 and 400, block 511 should track this as N changes. However, in some embodiments, methods 100 and 400 operate on word processing documents, which have formatting commands and may further contain hyperlinks and graphics, which are excluded from the IVC calculation. In contrast, some embodiments of method 500 operate on OCR process stream outputs, and can thus use a simpler set of modification rules to produce the equivalent output. The key concept here is that the modification rules in methods 100, 400 and 500 are tailored for the document types and formats they can be expected to operate upon, but are capable of producing the same output modified data sequence, if the documents have the same substantive content. In block 513, the corresponding integrity verification function should be used as was used in the corresponding layer calculation of block 105 or 405 to generate the verification IVC. It should also be understood that block 507 may occur after any of blocks 509-513.

The verification data sequence might be different than the original data sequence, based on whether the document was scanned in from a hard copy, such as a paper document. The primary distinguishing factor between the original data sequence and the verification data sequence is that the original data sequence is the baseline version. In some embodiments, there is no requirement that the original data sequence be generated in method 100 prior in time to the generation of the verification data sequence in method 500. For example, a document could be generated and sent to a recipient by a first, unsecure path. The recipient may suspect tampering, and begin operating method 500. Upon reaching the point that the original IVC is required, block 507, the document recipient may contact someone having a copy of the baseline, trusted document. Method 100, and possibly method 400, may then be initiated in order to generate the original IVC. Thus, the original IVC is the IVC generated from the trusted electronic document, even if calculated at a later time, and the verification IVC is the IVC generated from a document copy that is being tested for integrity.

In block 515, the Nth verification IVC is compared with the corresponding original IVC and blocks 503 through 515 are iterated until a sufficient number of IVC pairs are tested. In some embodiments, fewer than all the original IVCs may be verified. If a discrepancy is found in decision block 517, a difference report is generated in block 519. The difference report may be as simple as a warning to a user, an annotation in a log file, an update to a database, or may be a trigger for a quarantine action. Since method 500 may be used on binary executables, computer data files, or executable source code, such as a java script document, it may be incorporated into a malicious logic detection system that would isolate potentially dangerous files.

Figure 6:
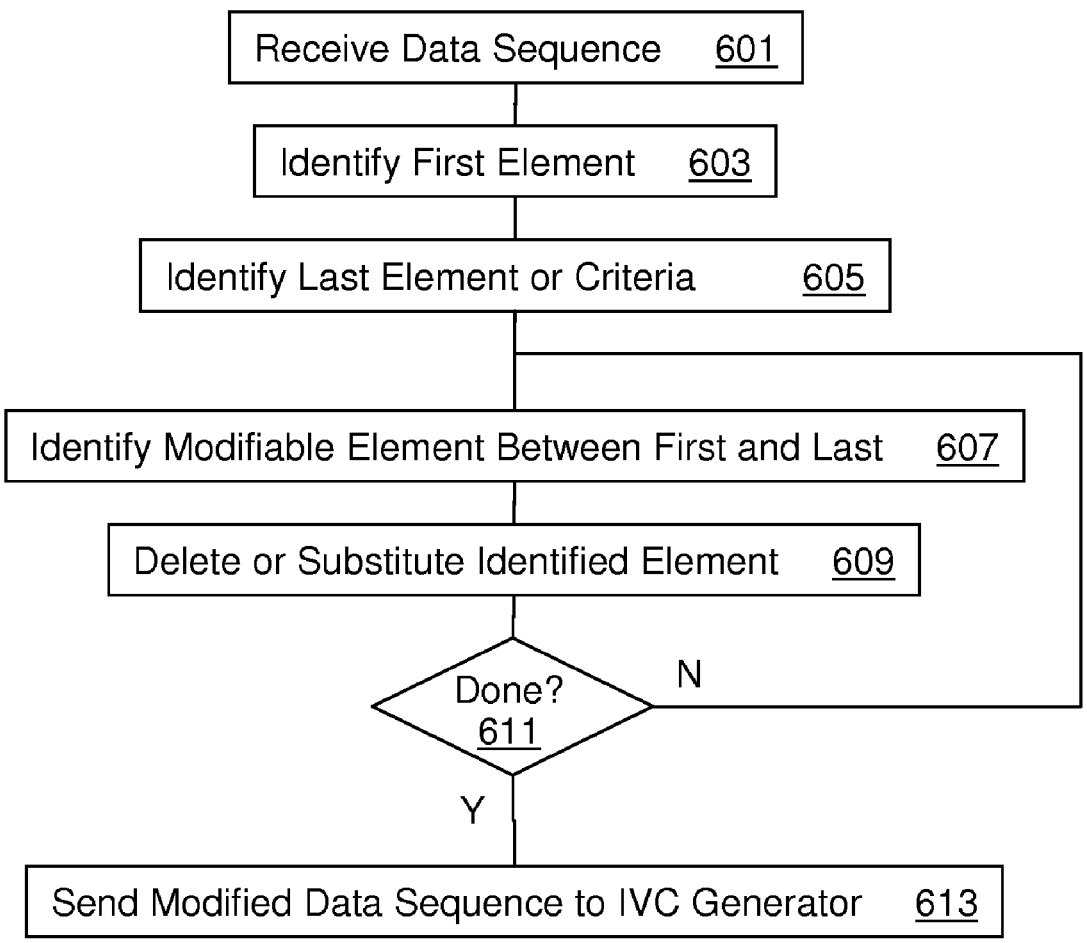
FIG. 6 illustrates a method for generating a modified data sequence compatible with the method illustrated in FIG. 1.

FIG. 6 illustrates a method 600 for generating a modified data sequence, compatible with method 100. For example, method 600 may comprise an embodiment of block 105. Further, method 600 may comprise embodiments of blocks 307 and/or 405. In block 601, a data sequence is received, such as the sequence generated in block 103 of method 100.

The sequence has a first element and a final, or last, element. These are identified in blocks 603 and 605 respectively. In block 607, at least one element in the input sequence is identified for modification, according to the modification rules, and the modification is performed in block 609. The modification may be omission of an unprinted element, such as deletion of a tab or a space, or may be the substitution of a tab character with a space character. In some embodiments, characters outside the English language alphabet character set are replaced with the nearest character in the English language alphabet character set. For example, an o with an umlaut may be replaced with either an "oe" or else an "o" alone. In decision block 611, if operation on the sequence is finished, the modified sequence is sent to the IVC generator, for processing as in block 107 of method 100.

It should be understood that method 600 illustrates a representative embodiment, and equivalent alternatives may be used, such as operating on an open data sequence in which the final element is not identified prior to beginning the data sequence modifications. Alternatives for various embodiments include modifying the memory location containing the input sequence; creating the output sequence in a different memory location; and generating a modification index, which indicates the modifications, thereby enabling production of the modified sequence by the IVC generating function, although the modified sequence itself may not actually exist in memory. Other alternatives include that block 607 and 609 are not performed individually on a character-by-character bases, but rather an index is created for all modifications, which are performed as a batch in a single pass through block 609. Further alternatives include that method 600 does not operate on an entire sequence, but is used or generating portions of a sequence on an "as needed" basis for the IVC generator, such as when blocks 105 and 107 of method 100 are performed overlapping in time. It should be understood that multiple options exist for improving process and algorithm speeds, and the presentation of particular embodiments in any of the figures is not intended to exclude possible variations, including those assisting with improving run time, memory usage, fault tolerance, and/or security.

Figure 7:
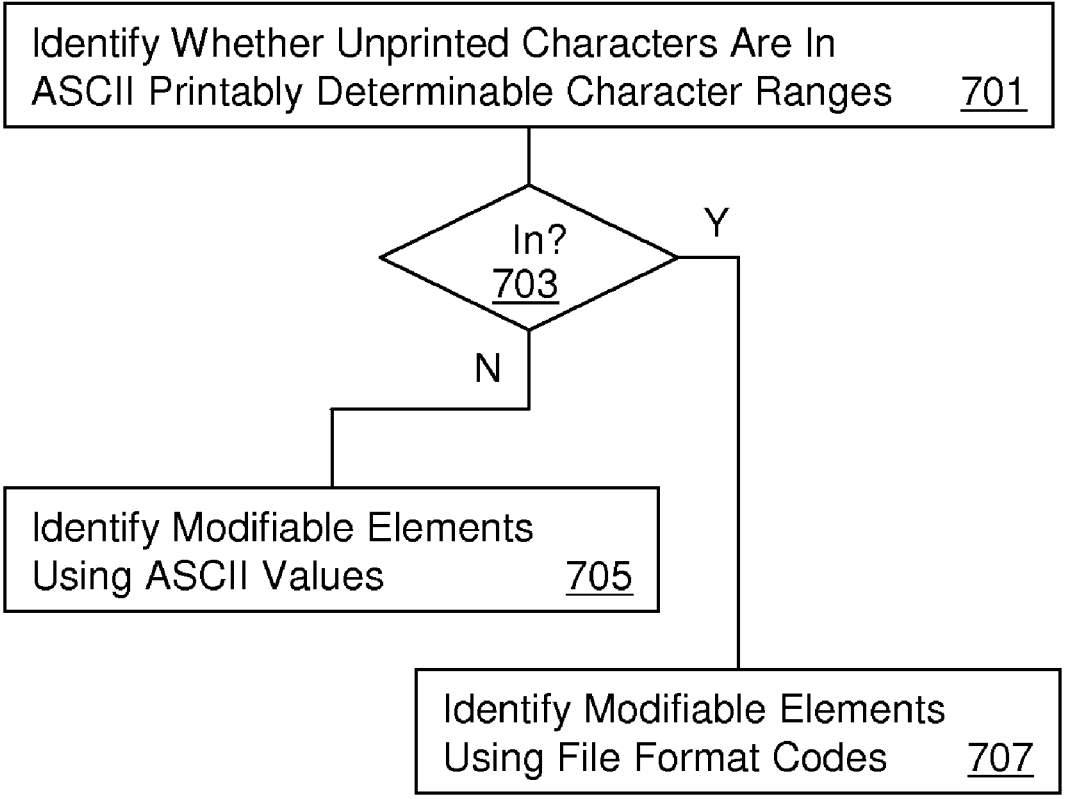
FIG. 7 illustrates a method for identifying a modifiable document element compatible with the method illustrated in FIG. 6.

FIG. 7 illustrates a method 700 for identifying a modifiable document element, compatible with method 600. For example, method 700 may comprise an embodiment of block 607. In block 701, a byte in the document is checked for whether it is within a set of printably determinable ASCII characters. In some embodiments, the set of printably determinable ASCII characters used in block 701 is fairly narrow, including only a portion of the printable characters in the English language alphabet. In some embodiments, easily confusable or rarely used characters are excluded, even if printable. If the tested character is outside the test ASCII range, as determined in block 703, it is identified as modifiable, either to be deleted or substituted with another character, in block 703. If the tested character is within the test ASCII range, as determined in block 703, it still might not be printable, based on the document type. For example, the character may be part of a formatting command, such as the </p> paragraph formatting identifier in an html document, or a formatting command in a proprietary word processing document. In such situations, the character may need to be excluded, in order to enable reliable recreation of the modified data sequence. Thus, in box 707, a second identification process is used, based on whether the tested character is likely to be printed. As a note for html documents on websites, there are different ways for a website visitor to experience the document, including viewing the html code that produces the web page, viewing the generated page, and having a speech synthesizer read the contents, such as with an internet browser configured to assist visually impaired persons. For websites, the data sequence used to generate the text stream for a speech synthesizer may, in some situations, be the preferred data sequence to be used as an input to methods 600 and 700. For some documents, such as pure textual streams, block 707 is optional.

Figure 8:
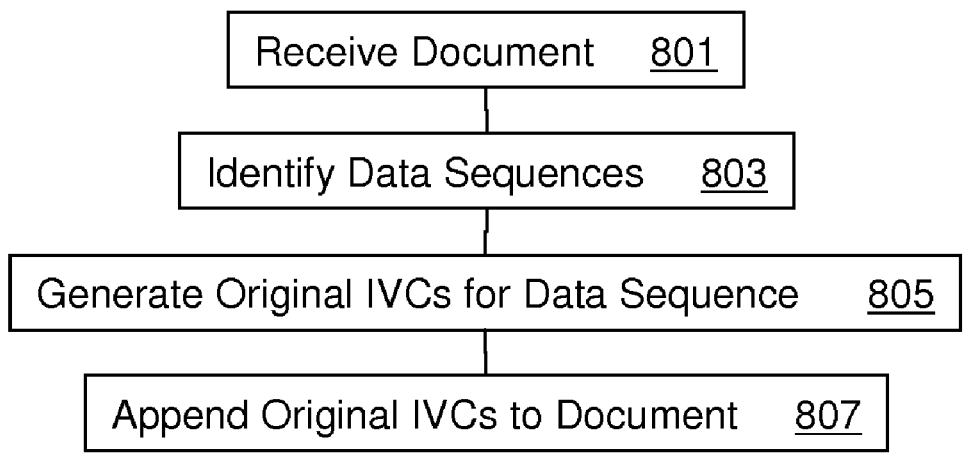
FIG. 8 illustrates a method for associating an IVC with a document, compatible with the method illustrated in FIG. 1.

FIG. 8 illustrates a method 800 for associating an IVC with a document, compatible with method 100. For example, method 800 may comprise an embodiment of block 109 or block 411 of method 400. Method 800 can be used in embodiments which calculate multiple IVCs per documents and then append the document with the IVCs. For example, method 800 can be used for calculating one IVC per page of a multi-page document, one IVC per paragraph of a single page document, for calculating a set of IVCs using different hash algorithms, or for calculating a set of IVCs, each generated using one of a set of increasingly restrictive exclusion rules. In block 801, a document is received, and in block 803, N data sequences are identified. The IVCs are generated in block 805 and appended to the document in block 807. In some embodiments, the IVCs are written into a document footer of a word processing document. Some embodiments include a word processing application module, which produces the IVCs and inserts them into the document, similarly to the way page numbers and editing dates are automatically inserted and updated.

Figure 9:
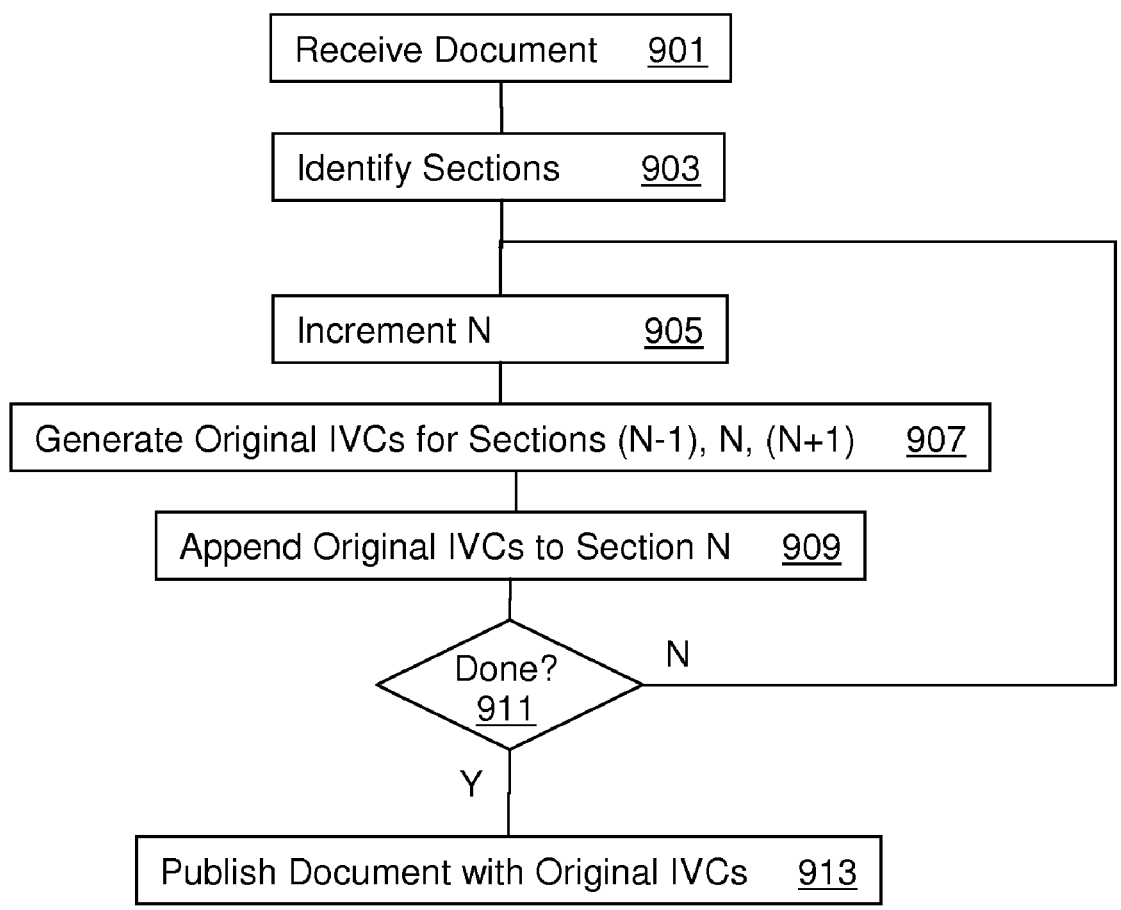
FIG. 9 illustrates another method for associating an IVC with a document, compatible with the method illustrated in FIG. 1.
Figure 13:
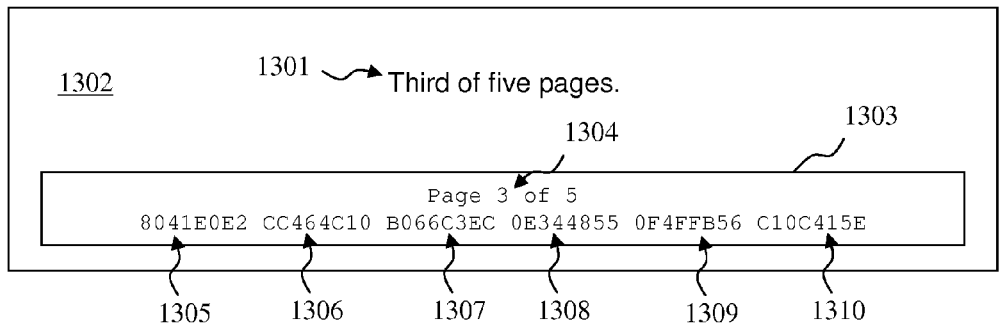
FIG. 13 illustrates an intact page from a tamper evident printed document.

FIG. 9 illustrates a method 900 for associating an IVC with a document, compatible with method 100. For example, method 900 may comprise an embodiment of block 109 or block 411 of method 400. Using method 900, IVCs for different sections of a multi-page document are placed on the same page. A representative result of an embodiment of method 900 is illustrated in FIG. 13, which described later in further detail. The use of some embodiments of method 900 renders a document not only tamper evident, but further enables a detection of tampering to be isolated to a specific page of a multi-page document.

In block 901, the document is received, for example a word processing document is created or opened for editing. In block 903, multiple sections of the document are identified, and N is incremented block 905. The multiple sections may overlap each other. As one example, a five page document may be divided into sections defined as: an aggregate of all the pages, each page, the combination of the first two pages, the combination of the second through fifth page, the combination of the first three pages, the combination of the third through fifth page, the combination of the first four pages, and the combination of the final two pages. This scheme provides N=12 different sections, although it should be understood that other divisional schemes are possible. In block 907, IVCs are generated for each of the sections, which are appended to a section. As a further clarification of the five-page document example, N=1 indicates the entire document, N=2 indicates page one, N=3 indicates page two, and N=4 indicates page three. It should be understood that other indexing schemes are possible. For N=2, page one of the document would then be appended with the IVC for the entire document (N=1), the IVC for page one (N=2), and the IVC for page two (N=3). Similarly, for N=3, page two of the document would be appended with the IVC for page one (N=2), the IVC for page two (N=3), and the IVC for page three (N=4). Some IVCs, such as the IVC for the entire document, may be appended to each page, or just the first and final page. In some embodiments, for some sections, blocks 907 and 909 are omitted.

In decision block 911, a decision is made as to whether all identified sections of the document have been processed and appended. If not, method 900 returns to block 903 to increment N, although some embodiments may return to other points in method 900. Otherwise, the document is published with the IVCs on a face of the document, such as in a footer, header, or appendix. In some embodiments, if duplex printing is available, the IVCs may be appended to the back of a page, or inserted into an electronic version of the document as to be printed on the back side of a page. In some embodiments, publishing a document comprises printing on paper. In other embodiments, publishing a document comprises generating a printer stream suitable to command a printer to print at least a portion of the document. In other embodiments, publishing a document comprises generating a publishing format file, such as a PDF, with or without text information, or an image-based file.

Figure 10:
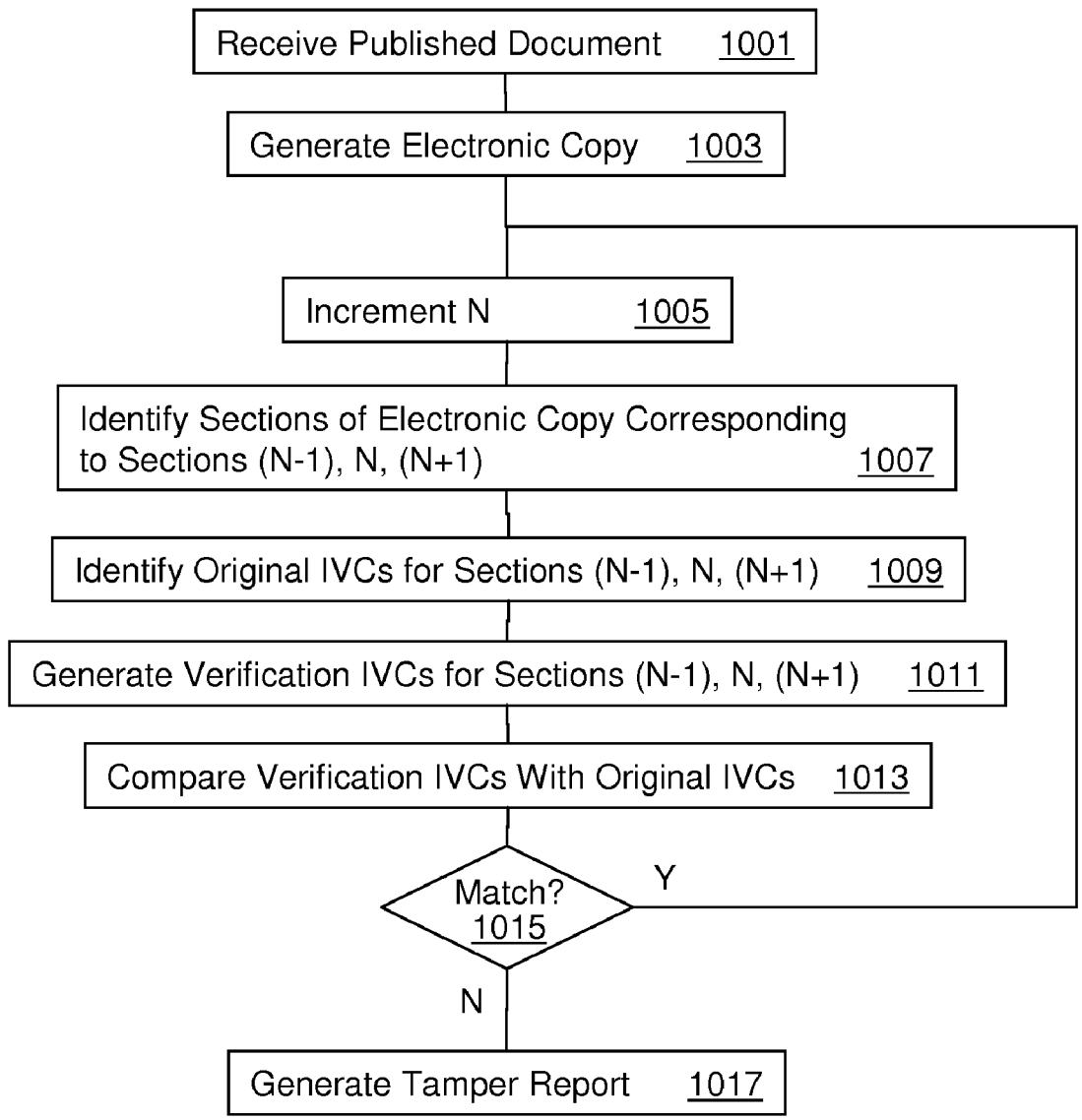
FIG. 10 illustrates a method for using IVCs to identify document tampering, compatible with the method illustrated in FIG. 9.

FIG. 10 illustrates a method for using IVCs to identify document tampering, compatible with method 900. Whereas method 900 renders a document tamper evident, method 1000 enables detection of tampering occurring after method 900, or even method 100, has been performed. That is, embodiments of methods 900 and 1000 can be used in tandem to prepare a document for transmission through an untrusted channel, and then verify that the document remained intact upon receipt. In the following description of method 1000, the five page document example from the description of method 900 will be used, although it should be understood that method 1000 has a wider range of applicability.

In block 1001, a copy of the document published in block 913 is received. Examples include that a PDF document may be read from a computer readable medium, a facsimile or email bitstream may arrive, and a paper document is obtained. In block 1003, an electronic copy is generated that has text information, such as by performing an OCR process, or any other suitable process that generates a textual sequence from an image or image-based digital file. In block 1005, N is incremented and sections of the electronic copy, which correspond to some of the sections identified in block 903, are identified in block 1007. Some embodiments of methods 900 and 1000 use a consistent rule set to identify document sections, such using as page breaks and, for each page, identifying prior cumulative and following cumulative sections. Thus, for some embodiments of method 1000, the document sections identified in block 903 may be independently identified in block 1007, even if the section selection information was neither appended to the document or accompanied the document in some other way.

In block 1009, the original IVCs, which were appended to the document in block 909, are identified in the current document copy. Examples include identifying a document footer using its position on the paper, and then extracting characters appearing in the footer after the OCR process. Any OCR process that may have occurred in block 1003 could have converted the original IVCs from images to text, which are then converted to numeric values in block 1009. Alternatively, an OCR process in block 1003 may be masked to omit document footers, thereby avoiding processing the original IVCs when generating the text stream. In such a situation, the document footer may need to be processed with a separate OCR process to extract the original IVCs. In some embodiments, the original IVCs are read from a document header, appendix, or an associated file.

In block 1011, the verification IVCs are generated, and are compared with the original IVCs in block 1013. It should be noted that the IVCs appearing on any page of a document would not include their own values in the calculation, unless a predictive-recursive hash algorithm could be found that produced a hash value of a document that already contained the calculated hash value within the document. In decision block 1015, if a match is detected and remaining sections require verification, method 1000 returns to block 1005 to increment N. Otherwise, a tamper report is generated in block 1017. In some embodiments, block 1017 comprises providing a warning to a user. In some embodiments, block 1017 comprises creating or annotating a log file.

Figure 11:
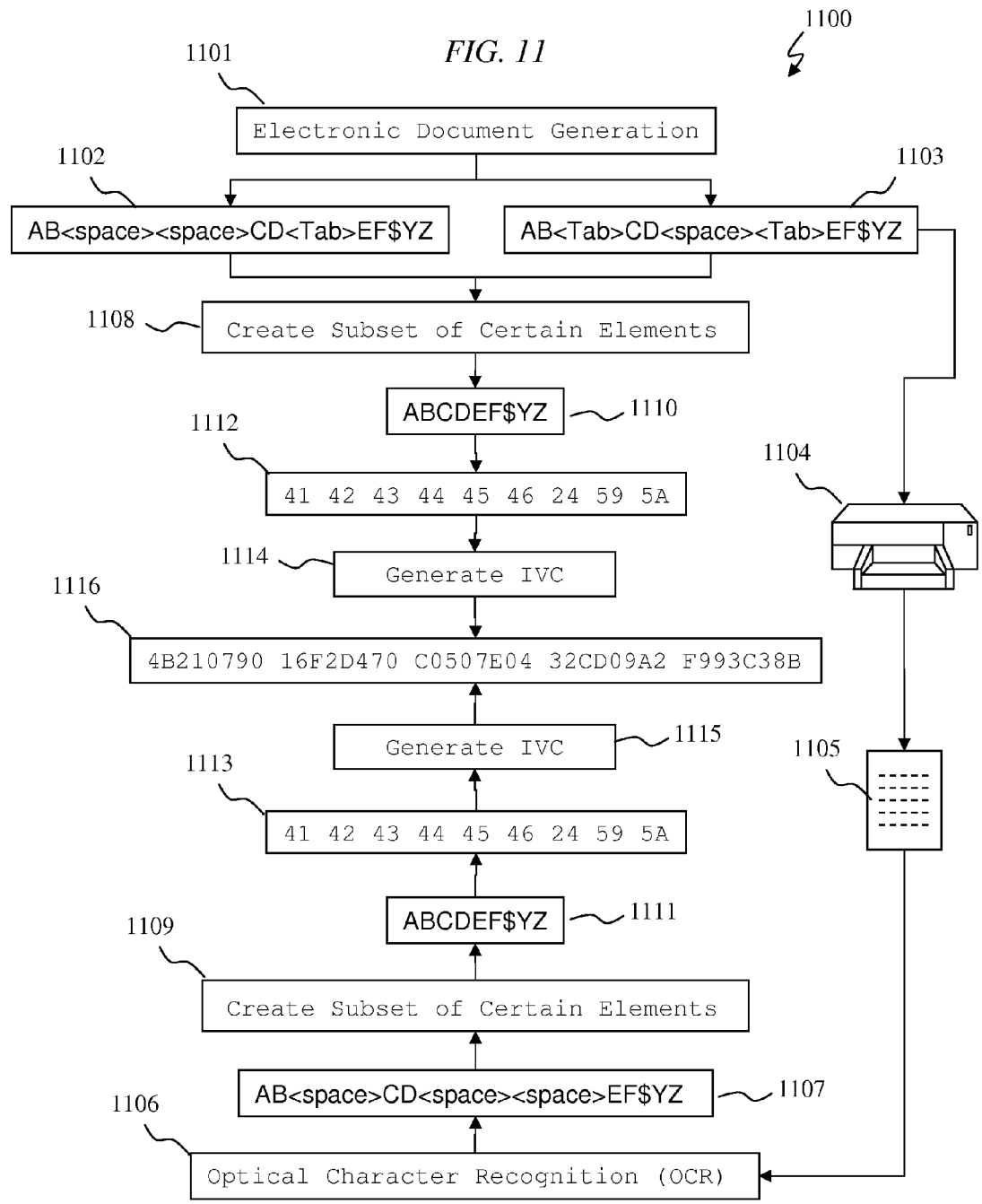
FIG. 11 illustrates a functional block diagram of an embodiment of a document integrity verification system.

FIG. 11 illustrates a functional block diagram of a document verification system 1100. System 1100, as illustrated, is a mixture of devices and processes, and shows how a consistent data stream can be regenerated from a printed document, even if the OCR processing produces a text stream containing a different number of spaces between printed letters than was in the original document.

Block 1101 represents electronic generation of an original document, such as by typing, speech recognition, or any other manner of generating a textual document. Two different electronic versions of the document are produced, document 1102 and document 1103, which can be stored on a computer readable medium as digital files. Document 1103 is sent to printer 1104 to produce a published copy 1105 on paper, which represents the untrusted copy. Published copy 1105 is scanned and subjected to an OCR process 1106 to produce a text stream 1107. If published copy 1105 contained any graphics or was printed on paper that contained a logo and/or other data in a letterhead section, OCR process 1106 can omit such information from output text stream 1107.

The first document version 1102 contains "AB", two spaces, "CD", a tab, and "EF$YZ". The formatting was changed to "AB", a tab, "CD", a space and a tab, and "EF$YZ" in document version 1103, which was the one printed. Due to scanning misalignment, or other OCR process imperfections, the reproduced text stream 1107 contains "AB", a space, "CD", two spaces, and "EF$YZ". Thus, OCR process 1106 improperly interprets one of the tabs as a single space. With this erroneous reproduction, a prior art hash function would mistakenly identify published copy 1105 as having been tampered.

However, original document modification process 1108 and verification modification process 1109 are able to alter the IVC generation process to mask predictable differences resulting from OCR process 1106. In the embodiment illustrated, modification processes 1108 and 1109 delete horizontal displacement elements, such as spaces and tabs, passing only printable characters "ABCDEF$YZ" to create modified data sequence 1110 and modified verification data sequence 1111, respectively. Thus, modification process 1108 excludes two spaces and a tab between the first and last elements, A and Z, of document 1102 but a space and two tabs from document 1102. This illustrates a partial example of method 300, shown in FIG. 3. If method 300 were to be implemented using documents 1102 and 1103, a difference record generated in block 317 of an embodiment method 300 would indicate the space and tab differences. Returning to FIG. 11, modification processes 1109 also excludes horizontal displacement elements and passes only printable characters "ABCDEF$YZ". Therefore, the predictable differences due to recreating an electronic document version from a printed version can be omitted from the integrity verification calculations and are thus eliminated as a source of false alarms of tampering.

The ASCII representations 1112 and 1113 of modified data sequence 1110 and modified verification data sequence 1111, respectively, are identical: {0x41 0x42 0x43 0x44 0x45 0x46 0x24 0x59 0x5A} in hex. The original IVC generation process 1114 and verification IVC generation process 1115 each use the SHA-1 to produce an identical IVC 1116. IVC 1116 represents either an original IVC or a verification IVC, based on its association with either trusted document version 1103 or the untrusted document version 1105. Thus, FIG. 11 demonstrates how two different electronic versions of an electronic document can produce the same IVC, which is reliably identical to an IVC produced after printing a copy to paper, scanning it, and then OCR processing it.

Figure 12:
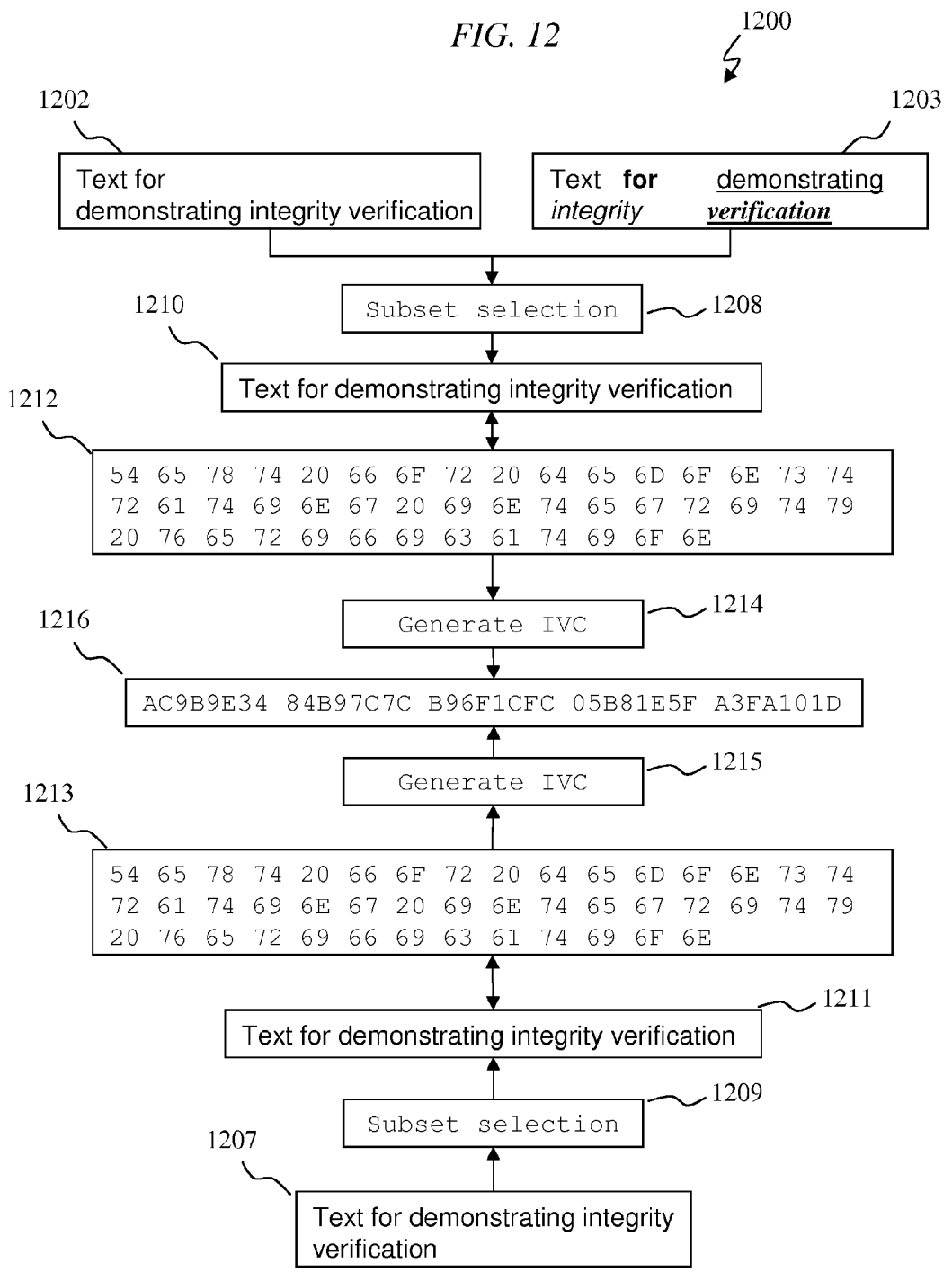
FIG. 12 illustrates another functional block diagram of an embodiment of a document integrity verification system.

FIG. 12 illustrates a functional block diagram 1200 of a document verification system 1200. System 1200, as illustrated, is a mixture of devices and processes, and is numbered similarly to system 1100 in FIG. 11. With system 1200, a method of operating in the presence of multiple font and formatting commands is shown. Specifically, FIG. 12 illustrates one way of handling underlining, italics, bold fonts, and vertical displacement elements, such as line feeds. Document versions 1202, 1203 and 1207 are formatted differently. In addition to spacing differences among the documents, document version 1202 has a line feed between "for" and "demonstrating", whereas document version 1203 has a line feed between "demonstrating" and integrity" and document version 1207 has a line feed between "integrity" and "verification". While OCR processes are unlikely to produce such errors relating to carriage returns, introducing such errors into the example demonstrates a method for making the IVC reproduction process fairly robust.

In the illustrated example, font commands such as bold, underlining and italics are omitted from the IVC calculations. Any OCR process used in conjunction with such an embodiment must be compatible with the separation of underlining from the text. In the illustrated example, line feeds and carriage returns are not passed through to the modified data sequence unaltered, although since these can often be reliably recreated for many documents, some embodiments may retain them intact. Instead, line feeds and carriage returns, if separate characters, are substituted with a single space. As illustrated, all displacement elements, whether horizontal, vertical or both, single or multiple, are substituted with a single space, ASCII 32 in decimal and 0x20 in hex. Modification processes 1208 and 1209 produce identical sequences 1210 and 1211, respectively, which are represented in ASCII hex as sequences 1212 and 1213. Sequences 1212 and 1213 are operated upon by IVC generation processes 1214 and 1215 to produce an identical IVC 1216. If IVC generation process 1215 did not produce IVC 1216, then document version 1207 would be identifiable as having been tampered. If modification process 1208 were configured to operate on word processing documents, which could include hyperlinks and graphics, modification process 1208 would require a document parsing process to identify unprinted characters that happened to be within the printable ASCII range, as well as other bytes that might coincidentally match the ASCII codes for spaces, tabs, line feeds and carriage returns. However, if process 1209 were configured to only operate on purely textual data bitstream coming from an OCR process that omitted font information, process 1209 could be considerably simpler than process 1208, but yet produce the same output.

Figure 14:
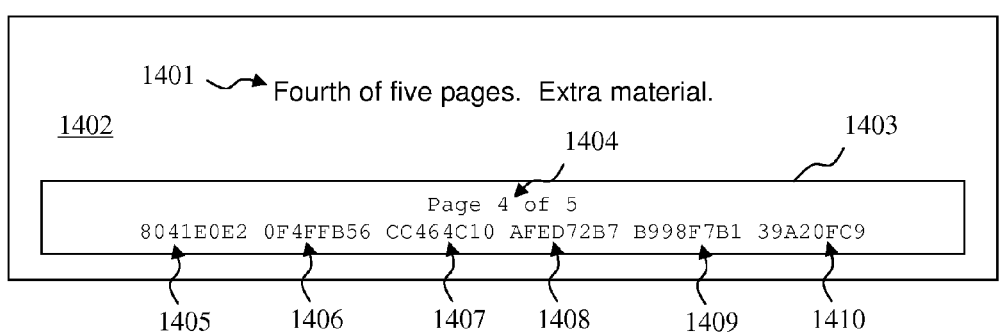
FIG. 14 illustrates a tampered page from a tamper evident printed document.
Figure 15:
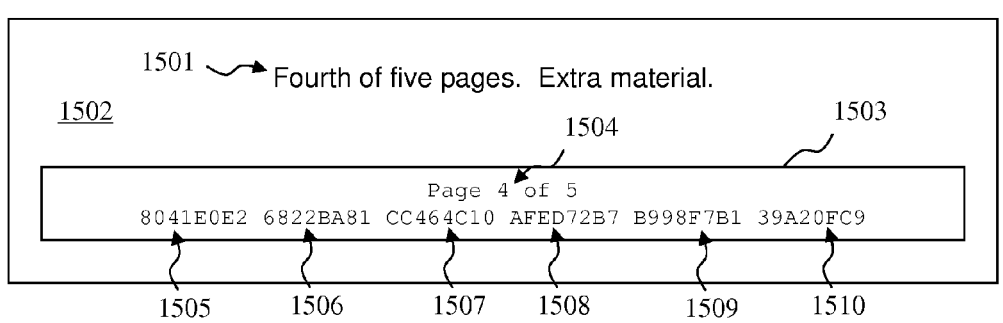
FIG. 15 illustrates another tampered page from a tamper evident printed document.

FIG. 13 illustrates an intact page 1300 from a tamper evident printed document. The example document used for FIGS. 13-15 is a five page document containing, in its entirety, the text string "First of five pages. Second of five pages. Third of five pages. Fourth of five pages. Fifth of five pages." with one sentence on each page. The third page, illustrated in FIG. 13 as page 1300 contains the text string 1301 "Third of five pages." Two tampered versions of the fourth page of this example document are illustrated in FIGS. 14 and 15. Dividing the document into the 12 sections of the example, used in the description of FIG. 9, gives the following text and corresponding IVC in hex:

an aggregate of all the pages:

"First of five pages. Second of five pages. Third of five pages. Fourth of five pages. Fifth of five pages." 0xD183DF1C 0x60A2A94A 0x67167C2B 0x1B1571F8 0x8041E0E2;

each page:

"First of five pages." 0x8E2B8A8B 0x2B9CA021 0x986A78EE 0xC190C923 0xBA7CDC0E,

"Second of five pages." 0x6FB49040 0x999A39C40x2FA4E7E 0xCCB9DABF 0xB066C3EC,

"Third of five pages." 0x77CCE801 0x563BB863 0x20D99BEE 0xC44B7861 0xCC464C10,

"Fourth of five pages." 0xCBF1D61B 0xE3EE1BB8 0x57694F92 0xDE5A739F 0xF4FFB56,

"Fifth of five pages." 0xC5842BEB 0xA001C1FB 0xF2AF23C3 0x9CDB9962 0xB998F7B1;

the combination of the first two pages:

"First of five pages. Second of five pages." 0xFD73C82C 0x37A47022 0x3382FBF 0xA85D49E3 0x70455759;

the combination of the second through fifth page:

"Second of five pages. Third of five pages. Fourth of five pages. Fifth of five pages." 0x1C8EA0B0 0x8357703A 0x8E85A3AC 0x26440913 0xB6681C2;

the combination of the first three pages:

"First of five pages. Second of five pages. Third of five pages." 0x75EF30B 0x7F624040 0x283225F5 0x1C47843 0xE344855;

the combination of the third through fifth page:

"Third of five pages. Fourth of five pages. Fifth of five pages." 0xC8B309C2 0x915CA283 0x414EE5E0 0x8BD0A8E1 0xC10C415E;

the combination of the first four pages:

"First of five pages. Second of five pages. Third of five pages. Fourth of five pages." 0x68B67B5E 0xC8B46BD10x6F035035 0x2462974B 0xAFED72B7;

and the combination of the final two pages:

"Fourth of five pages. Fifth of five pages." 0x3FDAE1C9 0x2C50 DB5F 0x65F0CD7D 0xE5E837FF 0x39A20FC9.

The example IVCs are calculated with the SHA-1, using printable characters and allowing a single space between separated words, but omitting page breaks, formatting and font commands, page numbers, and any other text appearing in a document footer or header. In FIG. 13, text string 1301, reciting "Third of five pages." appears in a content section 1302 of page 1300. Page 1300 also comprises a document footer box 1303, although it should be understood that a document footer may be identifiable by its position on a page, and does not require enclosure by a line. Document footer box 1303 contains a page number 1304, reciting "Page 3 of 5" and six IVCs 1305-1310. In the illustrated embodiment, the printed portions of the IVCs are the final 8 bytes of the calculated IVC values, although a different portion of any IVC may be used, including different portions for each of the differing pages. IVC 1305 represents the entire document. IVC 1306 represents the current page (third page). IVC 1307 represents the immediately prior page (second page). IVC 1308 represents the cumulation of all pages from the first page through the end of the current page (first through third pages). IVC 1309 represents the immediately following page (fourth page). IVC 1310 represents the cumulation of all pages, from the current page through the final page (third through fifth pages). Other IVCs may be used in other embodiments, such as including the IVC for pages N prior or following, in which N exceeds 1. In some embodiments of a verification process, the IVCs and possibly other contents of document footer box 1303 must be distinguished and separated from the contents of content section 1302, to avoid corrupting the verification IVC calculations.

Using the example scheme, the IVC sets used for each of the five pages will be:

Page 1: 0xD183DF1C 0x60A2A94A 0x67167C2B 0x1B1571F8 0x8041E0E2; 0x8E2B8A8B 0x2B9CA021 0x986A78EE 0xC190C923 0xBA7CDC0E; 0x00000000 0x00000000 0x00000000 0x00000000 0x00000000; 0x8E2B8A8B 0x2B9CA021 0x986A78EE 0xC190C923 0xBA7CDC0E; 0x6FB490-400x999A39C40x02FA4E7E 0xCCB9DABF 0xB066C3EC; 0xD183DF1C 0x60A2A94A 0x67167C2B 0x1B1571F8 0x8041E0E2.

Page 2: 0xD183DF1C 0x60A2A94A 0x67167C2B 0x1B1571F8 0x8041E0E2; 0x6FB490-400x999A39C40x02FA4E7E 0xCCB9DABF 0xB066C3EC; 0x8E2B8A8B 0x2B9CA021 0x986A78EE 0xC190C923 0xBA7CDC0E; 0xFD73C82C 0x37A47022 0x03382FBF 0xA85D49E3 0x70455759; 0x77CCE8010x563BB863 0x20D99BEE 0xC44B7861 0xCC464C10; 0x1C8EA0B00x8357703A 0x8E85A3AC 0x26440913 0x0B6681C2.

Page 3: 0xD183DF1C 0x60A2A94A 0x67167C2B 0x1B1571F8 0x8041E0E2; 0x77CCE801 0x563BB863 0x20D99BEE 0xC44B7861 0xCC464C10; 0x6FB49040 0x999A39C4 0x02FA4E7E 0xCCB9DABF 0xB066C3EC; 0x075EF30B 0x7F624040 0x283225F5 0x01C478-43 0x0E344855; 0xCBF1D61B 0xE3EE1BB80x57694F92 0xDE5A739F 0x0F4FFB56; 0xC8B309C2 0x915CA283 0x414EE5E00x8BD0A8E1 0xC10C415E.

Page 4: 0xD183DF1C 0x60A2A94A 0x67167C2B 0x1B1571F8 0x8041E0E2; 0xCBF1D61B 0xE3EE1BB8 0x57694F92 0xDE5A739F 0x0F4FFB56; 0x77CCE801 0x563BB863 0x20D99BEE 0xC44B7861 0xCC464C10; 0x68B67B5E 0xC8B46BD1 0x6F0350350x2462974B 0xAFED72B7; 0xC5842BEB 0xA001C1FB 0xF2AF23C3 0x9CDB9962 0xB998F7B1; 0x3FDAE1C90x2C50 DB5F 0x65F0CD7D 0xE5E837FF 0x39A20FC9.

Page 5: 0xD183DF1C 0x60A2A94A 0x67167C2B 0x1B1571F8 0x8041E0E2; 0xC5842BEB 0xA001C1FB 0xF2AF23C3 0x9CDB9962 0xB998F7B1; 0xCBF1D61B 0xE3EE1BB8 0x57694F92 0xDE5A739F 0x0F4FFB56; 0xD183DF1C 0x60A2A94A 0x67167C2B 0x1B1571F80x8041E0E2; 0x00000000 0x00000000 0x00000000 0x00000000 0x00000000; 0xC5842BEB 0xA001C1FB 0xF2AF23C3 0x9CDB9962 0xB998F7B1.

Zeros are used when no IVC is available according to the scheme, such as for the prior page IVC on the first page (which likely has no prior page), and the following page IVC on the final page (which likely has no following page). Another optional scheme, which saves footer space by one IVC for three page minimum documents uses: current page; prior page, or entire document if first page; cumulative prior pages; following page, or entire document if final page; and cumulative following pages. To save space on the document faces, only portions of the calculated IVCs are appended to the document, as shown in FIGS. 13-15.

A word processor, document publishing software, web browser, facsimile machine, or printer can be used to produce page 1300 in accordance with one or more embodiments of methods 100, 400, 600, 700, 800, and/or 900. An exemplary word processor will have the functionality to format the document into pages; use page breaks to identify sections; generate the 12 original data sequences using the page breaks and omitting possible incompatible graphics, footer and header data; and either introduce the IVCs into footer box 1303 during editing, similarly to updating page numbers, or when the document is rendered into print commands sent as a bitstream to a printer. An exemplary printer will have the functionality to parse an incoming bitstream; determine the 12 sections; possibly perform an optional OCR process, if the bitstream is in image format; and print the IVCs on the paper, either the front or the back. An exemplary facsimile machine will have the functionality to parse a bitstream, either an incoming fax message or the scanned image that is to be sent; determine the 12 sections; perform an OCR process; and print the IVCs on the paper, either the front or the back, similar to the way in which FAX transmittal data is appended to documents. An exemplary document publishing software application will have functionality similar to the exemplary word processor, except the output will be a digital file stored on a computer readable medium, such as a PDF file, rather than a bitstream sent to a printer.

For embodiments in which only a portion of the IVC is put onto the document, the same portion need not be used on every page. For example, FIG. 13 illustrates the use of the final 8 bytes of the IVC of the entire document on each page. However, for some embodiments, the bytes of the IVC used on one page may be different than used on a subsequent page. Since the IVC verification process will generate the entire IVC, finding any portion of that IVC on a page provides evidence that the IVC is valid. Using the same portion on each page facilitates a rapid check for consistency, however, if only a portion of the IVC is used in order to preserve footer space, the entire IVC might not appear when using such a scheme with a short document. Instead, a slightly different scheme could be employed in which each page has a subsequent set of 8 bytes, such that over 5 pages, the entire IVC of the entire document is printed, and if a 6th page were present, the IVC byte portions would begin repeating. Yet another modification would be that portions of the IVC would overlap on subsequent pages, such that bytes 1-7 appear on page 1, bytes 6-12 appear on page 2, and so on. This both preserves space and provides continuity of the IVC portions among the pages. However, in some embodiments, the portion of the IVC written to the page can be encrypted with a key that is accessible for later verification or other wise changed in a manner that the published IVC portion can be recovered later.

FIG. 14 illustrates a tampered page 1400, which is a tampered version of the fourth page from the example five page document. Page 1400 comprises a text string 1401 in a content section 1402 and a document footer box 1403. Document footer box 1403 contains a page number 1404, reciting "Page 4 of 5" and six IVCs 1405-1410. In the illustrated embodiment, the printed portions of the IVCs are the final 8 bytes of the calculated IVC values. IVC 1405 represents the entire document. IVC 1406 represents the current page (fourth page). IVC 1407 represents the immediately prior page (third page). IVC 1408 represents the cumulation of all pages from the first page through the end of the current page (first through fourth pages). IVC 1409 represents the immediately following page (fifth page). IVC 1410 represents the cumulation of all pages, from the current page through the final page (fourth and fifth pages).

Page 1400 has been tampered by adding extra material. Specifically, text string 1401 recites "Fourth of five pages. Extra material." instead of merely "Fourth of five pages." A quick check for consistence between pages 1300 and 1400, of FIGS. 13 and 14, respectively, indicates the following: IVCs 1305 and 1405, which represent the entire document, are identical. IVC 1306, which appears on page 1300 and represents the current page (page 1300), is identical to IVC 1407, which appears on page 1400 and represents the prior page (page 1300). IVC 1309, which appears on page 1300 and represents the following page (page 1400), is identical to IVC 1406, which appears on page 1400 and represents the current page (page 1400). If any of these IVC pairs did not match, as is described later with FIG. 15, a human observer could identify tampering with a simple visual check. However, these IVC pairs pass a consistency check, so further analysis is needed.

Several options are available for detecting the tampering to page 1400. The quickest, if page 1400 is suspect, is to scan page 1400 first, perform an OCR process to generate an electronic data sequence representing text string 1401, in which at least one of the scanning and OCR process distinguishes between content section 1402 and document footer box 1403, and then generating a verification IVC for text string 1401. Using the SHA-1, the resulting verification IVC is 0x9725FE54 0x804BB6FA 0x4062E1EF 0xB8D67EA 0x6822BA81. The value of IVC 1406, 0x0F4FFB56, does not match any portion of the verification IVC, and thus tampering of page 1400 is detectable.

Another option is to scan in the entire document and independently reproduce a verification IVC for the entire document. This produces 0x73532398 0x048317FB 0x883C83860x4B1B1EB5 0x6AE6ECA1. The value of IVCs 1305 and 1405, 0x8041E0E2, does not match any portion of the verification IVC, and thus tampering of the entire document is detectable. If a document has not been tampered, the check of the entire document with a single verification IVC may be quicker than a series of individual page checks. However, once tampering has been detected, it may be further desirable to locate the affected section. For a short document, a next step of checking individual pages may be fastest. However, for long documents, the cumulative IVCs enable a more rapid diagnosis, such as successively dividing the document into halves, and further checking only the tampered half.

For example, since the third page, page 1300, is the middle page, the cumulative prior and cumulative following sections can be checked independently, in order to determine whether tampering is in the first half and/or the second half. Verifying the cumulative prior section includes generating a verification IVC for the first through third pages, and comparing it with IVC 1308. The verification IVC is 0x075EF30B 0x7F624040 0x283225F5 0x01C47843 0x0E344855, which contains IVC 1308. Thus, there is likely no tampering in the first through third pages, but instead in one of the following two pages. This may be verified by generating a verification IVC for the third through fifth pages, and comparing it with IVC 1310. The verification IVC for the third through fifth pages is 0xAB955A3F 0xC4B617D1 0x569EEA97 0x2FE1BE63 0x907ACFDD, which does not contain IVC 1310, 0xC10C415E. Alternatively, checking IVC 1410 could isolate the pampering to one of the fourth and fifth pages, and checking one of IVCs 1406 or 1408 could isolate the tampering to the fourth page (page 1400).

FIG. 15 illustrates a tampered page 1500, which is another tampered version of the fourth page from the example five page document. Page 1500 comprises a text string 1501 in a content section 1502 and a document footer box 1503. Document footer box 1503 contains a page number 1504, reciting "Page 4 of 5" and six IVCs 1505-1510. In the illustrated embodiment, the printed portions of the IVCs are the final 8 bytes of the calculated IVC values. IVC 1505 represents the entire document. IVC 1506 represents the current page (fourth page). IVC 1507 represents the immediately prior page (third page). IVC 1508 represents the cumulation of all pages from the first page through the end of the current page (first through fourth pages). IVC 1509 represents the immediately following page (fifth page). IVC 1510 represents the cumulation of all pages, from the current page through the final page (fourth and fifth pages).

Similar to page 1400 of FIG. 14, page 1500 has been tampered by adding extra material. Specifically, text string 1501 recites "Fourth of five pages. Extra material." instead of merely "Fourth of five pages." Page 1500 differs from page 1400 in that IVC 1506 actually is a correct IVC for the tampered text string 1501. Thus, checking IVC 1506 alone will not reveal tampering. However, comparing IVC 1506, 0x6822BA81, with IVC 1309, 0x0F4FFB56, reveals a discrepancy, and thus tampering to page 1500.

Revisiting the scenario addressed in the Changing Lanes movie, had the signature page contained an IVC for the document with which it was originally associated, the forgery could have been easily detected. Additionally, had the original signer written an IVC by hand on each page, they would appear in his handwriting, which is more difficult to forge than printing by a printer. To the extent that any prior art method or combination of methods for rendering documents tamper evident is practical, operable and/or obvious, but has not yet been required by courts when compiling important documents, the courts are expressly choosing to allow forgery of contestable evidence to remain a nearly trivial effort.

Figure 16:
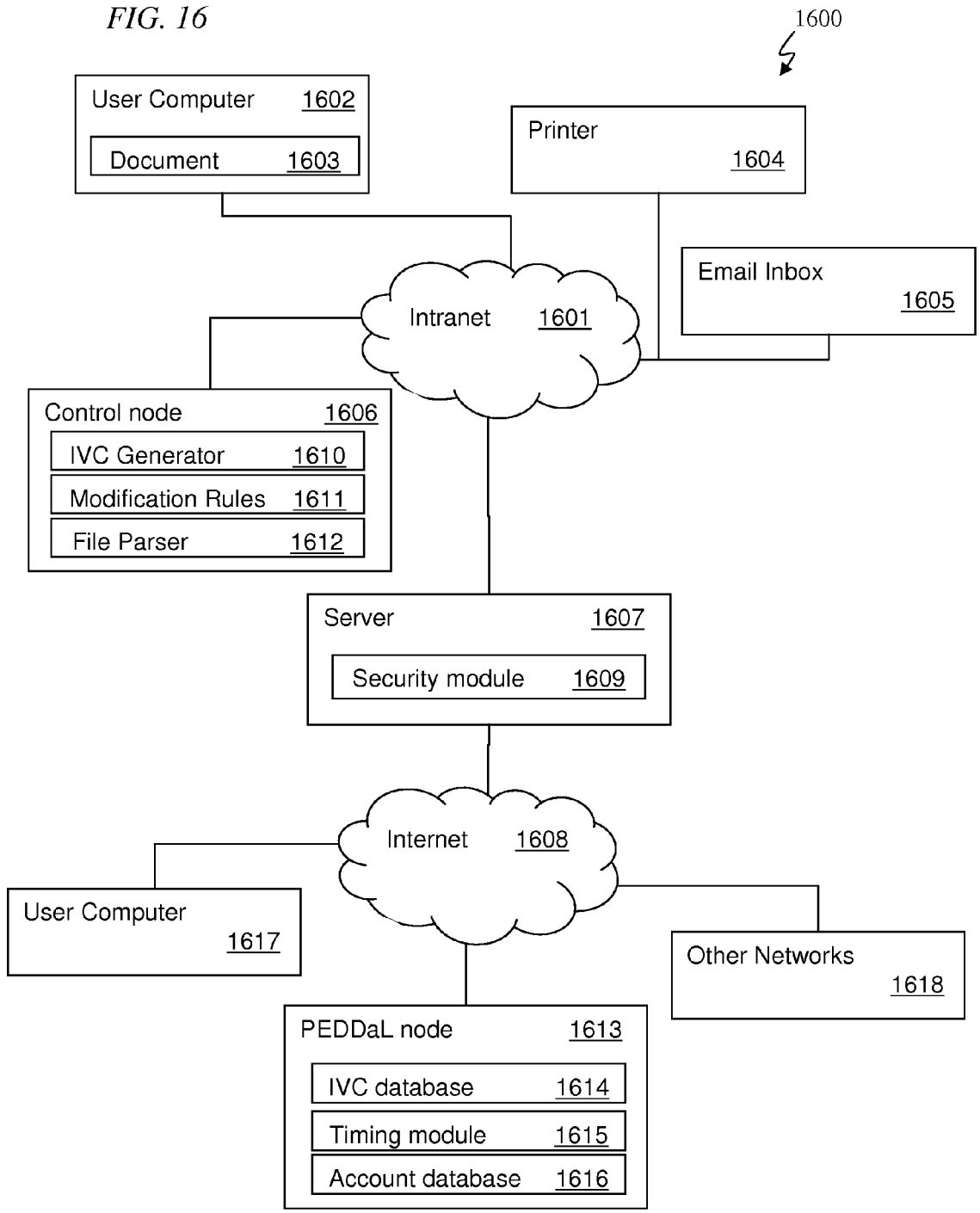
FIG. 16 illustrates an embodiment of a system for creating a public database of IVCs.

FIG. 16 illustrates an embodiment of a system 1600 for creating a public database of IVCs. Illustrated system 1600 comprises an intranet 1601, although it should be understood that other computer networks may be used. A user computer 1602 is used to create document 1603, and is coupled to intranet 1601. Also coupled to intranet 1601 are a network printer 1604, an email inbox 1605, a control node 1606, and a server 1607, which acts as a gateway to internet 1608, using a security module 1609 as a traffic gatekeeper. Control node 1606 is configured to intercept document 1603 as it is sent from user computer 1602 to printer 1604, email inbox 1605, control node 1606 itself or an outside email address across internet 1611.

Control node 1606 comprises an IVC generator 1610, a modification rule module 1611, and a file parser 1612. File parser 1612 identifies the type of document 1603, generates at least one original data sequence, selects a type-specific modification rule set from modification rule module 1611, and calls IVC generator 1610 to produce an IVC. It should be understood, however, that alternative configurations of control node 1606 can perform the same required functions. Control node 1606 illustrates an embodiment of a page verification for printed documents (PaVePaD™) system.

Upon generation of the IVC, control node 1606 communicates the IVC to a public electronic document dating list (PEDDaL™) node 1613, which hosts an IVC database 1614, a timing module 1615, and an account database 1616. IVC database 1614 stores time-stamped IVCs for multiple users, and is available for public inspection. IVC database 1614 enables the author of document 1603 to prove the existence of document 1603 as of the date that document 1603 was sent to printer 1604, email inbox 1605, or any other destination monitored by control node 1606. However, IVC database 1614 does not betray the contents of document 1603 to the public, because IVC generator 1610 is a one-way function. It should be noted that, while the illustrated embodiment shows the use of IVCs generated in accordance with modification rules module 1611, some embodiments of IVC database 1614 can store prior art hash values.

Using database 1614 is then easy, due to the automated operation of the illustrated system. A user merely needs to send document 1603 to a printer or email inbox, such as printer 1604 and email inbox 1605, which has been designated as a recipient node for triggering a database entry by an administrator of intranet 1601. For example, a large company may set up a designated printer 1604 in an engineering department, and instruct employees to print certain technical reports to printer 1604. As an alternative example, a law firm may instruct its support staff to email copies of PDF documents filed with the US PTO to a designated email inbox 1605, so that if a document date is later contested, an independent database can at least verify the document's existence as of a certain date. In some embodiments, control node 1606 can further determine that a received document is sent from a previously identified computer outside security module 1609 of server 1607, such as computer 1617, if an authorized user is logged into intranet 1601 from a remote location. However, control node 1606 may further avoid processing print jobs or documents sent to printer 1604 or email inbox 1605 by unauthorized parties, in order to avoid triggering undesired IVC generation and database entries.

In operation, an exemplary system may function as follows: Upon a user sending document 1603 to a monitored destination, control node 1606 sends a message and a user identification (ID) to database node 1613. Database node 1613 compares the retrieves time information from timing module 1615, and using the user ID, identifies the user in account database 1616. Other networks 1618 can comprise another control node, which automatically interacts with database node 1613, similarly as control node 1606. Account database 1616 enables identification of the responsible party to bill for database usage. Database node 1613 can operate on either a per-use or a capacity subscription basis, similar to the way a communication service permits a user to contract for a given number of messages on a monthly basis, but charges for messages above that number.

If database node 1613 determines that a requested database entry is from an authorized database user, it retrieves time information from timing module 1615. Database node 1613 then sends the time information, and optionally, a security code to use when submitting a database entry. Control node 1606 timestamps the generated IVC using the time information received from the database node or optionally, its own internal clock, and returns the IVC, along with an optional timestamp and response security code. Database node 1613 timestamps the incoming information, using information from timing module 1615, and updates IVC database 1614 with the received IVC and at least one timestamp. Submitter ID information may optionally be added to IVC database 1614. Database node 1613 then sends an acknowledgement of the IVC addition, so that control node 1606 does not need to resend the information after a time-out. Database node 1613 and control node 1606 exchange fee information, and database node 1613 updates account database 1616 to increment the number of IVC submissions from the account holder associated with control node 1606. As some point, the owner of control node 1616 is billed for the database services. Upon some event, perhaps IVC database 1614 reaching a certain size, or the lapse of a predetermined number of days, a permanent computer readable medium, such an optical media, containing a copy of IVC database 1614, is sent to at least some of multiple contributors to IVC database. Additional copies may be sent to other data archival service providers and libraries. Older versions of IVC database 1614 may remain available over internet 1608 for searching purposes.

At a later time, the author of document 1603 may be accused of trade secret theft, and may wish to use document 1603 to prove prior conception of an invention. Consider, for this example, the convenient case that both the author of document 1603 and the accuser submitted IVCs to the same version of IVC database 1614, and that the accuser kept accurate date records of the receipt of the media. Accuser then has possession a copy of a portion of the IVC database 1614, which can be used to prove that document 1603 existed, at the latest, as of the time that the accuser received the media. The author may provide a printed paper copy of document 1603, or a copy in another format, to the accuser, along with an assertion of the date at which document 1603 was allegedly created, and instructions on where to find the IVC in the accuser's own copy of the old IVC database. The accuser can then independently generate the IVC, even from a paper copy of document 1603 and verify that it matches a record in IVC database 1614. Upon this occurrence, the accuser must then admit to the existence of document 1603 prior to the date that the accuser's own internal records indicate receipt of the media containing IVC database 1614. Other options exist when the convenient case described above does not exist, such as a third party performing the verification, using a copy of the proper edition of the IVC database 1614 from a trusted archival source. This option allows the verification of the date of an important document, even without disclosing the contents outside trusted parties, and can thus provide an efficient, reliable alternative to many intellectual property (IP) litigation procedures.

Thus, a large organization can automatically, and cost-effectively, provide for date-proving documents generated by its employees, which contain important IP, in a manner previously unavailable. Some embodiments of a publicly-available PaVePaD™ system, similar to control node 1606, can interface with PEDDaL™ node 1613 to simplify automatic generation and registration of IVCs.

The new paradigm can be useful to the US PTO by making available, as prior art, an entirely new class of documents for use in 35 U.S.C. §§102 and 103 rejections of patent applications, which had previously been unavailable to the US PTO. For example, documents appearing on websites, if properly processed and entered into an IVC database, may now be dated with certainty and thus identifiable as prior art. The new paradigm enables rendering a new class of documents tamper-evident, and thus date provable, such as printed documents and even documents placed on the internet. That is, a document placed on the internet, even by an untrustworthy party can be now be proven to have existed on a certain date prior to being viewed or cited as a reference, and unmodified since that date. This is a significant development, and a surprising result of violating fundamental security paradigms. The failure of others to provide for rendering certain classes of documents tamper evident and date provable, leaving them unusable for important functions, is added evidence of the novelty of the newly introduced paradigm.

An example IVC database entry includes the following 1024 bit, 1 Kb, sequence for a document to be verified in digital format, not subject to document-type exclusion rules:

Bits 1-512: the SHA-512 message digest of the entire document;

Bits 513-672: the SHA-1 message digest, with position-based exclusion rules using the SHA-2 message digest for exclusion indexing;

Bits 673-832: the SHA-1 message digest, with further position-based exclusion using the prior SHA-1 message digest for exclusion indexing;

Bits 832-1024: timestamps, IVC generation indicia including software version and rule options, and other administrative data to facilitate database searching and/or IVC recreation.

It should be understood, however, that document-type exclusion rules may be used, as well as other IVC generation algorithms, and a different number of IVC layers.

Figure 17:
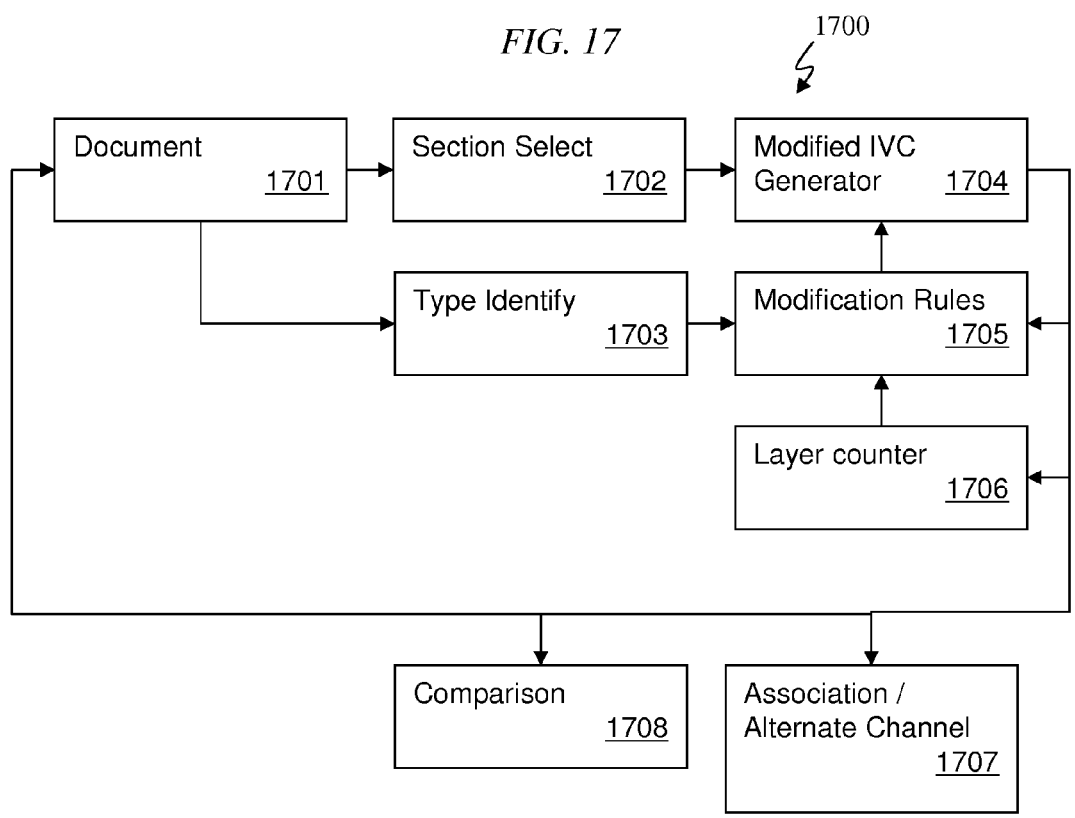
FIG. 17 illustrates another functional block diagram of an embodiment of a document integrity verification system.

FIG. 17 illustrates a functional block diagram of an embodiment of a document integrity verification system 1700. System 1700 is illustrated as an iterative system, and is suitable for generating original IVCs to render a document tamper evident, for generating verification IVCs to test for integrity, and can be used to check two documents for differences, even if neither is trusted. As illustrated, system 1700 is capable of performing methods 100-1000, if representing an apparatus, but may be considered a generalization of methods 100-1000, if viewed as a method flowchart.

System 1700 comprises a document 1701, which interfaces with a section selection module 1702 and a type identification module 1703. Section selection module 1702 generates an original data sequence that is to be rendered tamper evident or tested for tampering using modified IVC generation module 1704. Modified IVC generation module 1704 receives input from modification rules module 1705, which in turn, receives input for selecting specific modification rules from type identification module 1703 and layer counter 1706. Modified IVC generation module 1704 can output IVCs to document 1701, for example a document footer, to an association/alternative channel system 1707, and/or to a comparison system 1708. It should be understood that modification rules module 1705 can use different rules in each layer, selecting among position-based and document type-based rules.

As an example, operating on document 1701 may involve the following process: The entire document is hashed with SHA-512, a member off the SHA-2 family, for layer 1. Modification rules for layer 1, in this example embodiment, are no modification and indicate use of SHA-512. The output of the layer 1 cycle from module 1704 is fed back into modification rules module 1704, and triggers an increment in layer counter 1706. Layer 2 uses SHA-1, with bytes excluded from the original document, indexed according to the SHA-512 message digest. For example, if the first byte of the layer 1 message digest is a 5, the 6th byte of the original document is excluded when generating the modified data sequence. In this example, zero-based indexing is used, so an index of 0 is the first element. It should be understood, however, that alternative arrangements can be used, such as not excluding a byte of a message digest byte used for indexing is a 0. If the second byte of the layer 1 message is a hex E, which is decimal 14, the 15th byte of the original data sequence, following a reference point, is excluded when generating the modified data sequence. The counting point for determining the second byte to exclude can be immediately after the first non-excluded byte, or start again at the 17th byte. This process iterates, repeating the use of the message digest, if document 1701 is longer than the message digest. If the counting restart points are based on the position of an excluded byte, then the number of bytes excluded will be determined by the values of the bytes in the SHA-512 message digest, with lower values causing more byte exclusions, due to short counting intervals. If the counting position starts over every 16 bytes, then one in 16 bytes of document 1701 will be excluded when generating the modified data sequence. It should be understood, however, that alternative methods of chaining the IVC generating functions can be used.

Further describing the example embodiment, SHA-1 is used for layer 2. One reason for the use of a different algorithm is that if SHA-512 is later found to have an exploitable weakness, the use of a different hash function can act as a safety net. The above-described process is repeated for layer 3, using the message digest from layer 2 to further modify the sequence used in layer 2. Alternatively, the layer 3 process could modify the original data sequence. This is different than merely applying the multiple hash functions to an unmodified data sequence. By modifying the data sequence with the output of one hash function, the layers become intertwined, complicating the calculations needed to find a compensating set of changes.

Figure 18:
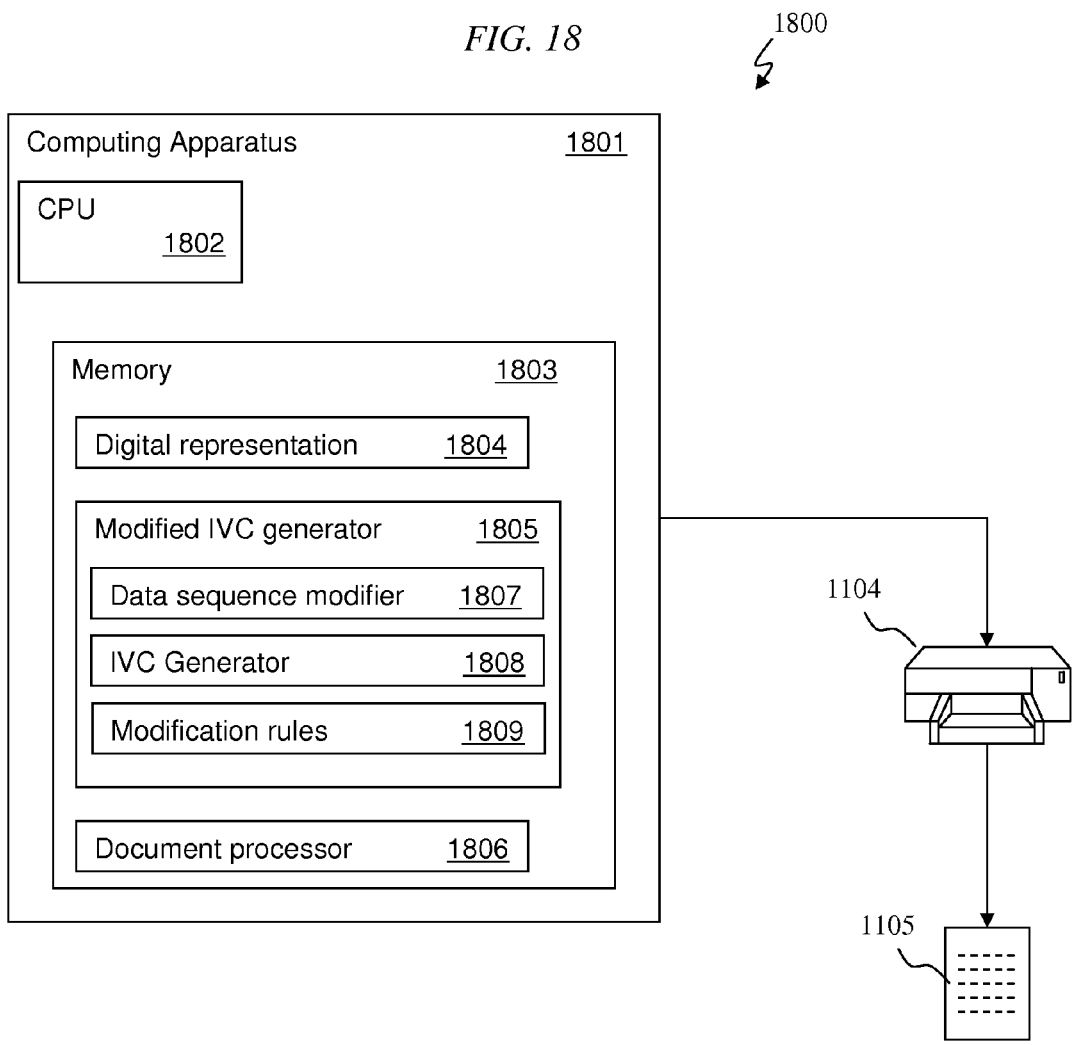
FIG. 18 illustrates a diagram of an embodiment of a document integrity verification apparatus.

FIG. 18 illustrates a diagram of an embodiment of a document integrity verification apparatus 1800. Apparatus 1800 comprises a computing apparatus 1801 coupled to printer 1104, which prints document 1105. Computing apparatus 1801 is configured to perform at least a portion of any of methods 100-1000, and the functions of control node 1606 and system 1700. In some embodiments, printer 1104 is a multi-function device, capable of scanning printed documents to facilitate OCR. Computing apparatus 1801 comprises a CPU 1802, although it should be understood that a plurality of CPUs may be used within computing apparatus 1801. Computing apparatus 1801 further comprises memory 1803, which is coupled to CPU 1802. Memory 1803 may comprise volatile random access memory (RAM), non-volatile RAM, and other computer-readable media, such as optical and magnetic media.

Memory 1803 comprises a digital representation of a document, for example document 1105, a modified IVC generator 1805, and a document processor 1806. In some embodiments document processor can parse digital representation 1804 to classify document type-based content to facilitate data sequence modification. Examples previously described include classifying bytes as either printable data or non-printable data for word processing type documents, and as executable CPU instructions or unreachable instructions in a binary executable file. Modified IVC generator 1805 comprises data sequence modifier 1806, IVC generator 1807, and modification rules 1808. In some embodiments, data sequence modifier 1806 and IVC generator 1807 comprise instructions executable by CPU 1802, along with supporting data. In some embodiments, data sequence modifier 1806 and IVC generator 1807 comprise circuitry capable of performing computations and processing, such as a field programmable gate array (FPGA) and/or an application specific integrated circuit (ASIC).

As used with any of the methods or systems described herein, a verification standard is an output of an integrity verification function that is calculated when the document is in a baseline reference condition. That is, a verification standard is what a subsequent output of an integrity verification function is compared against, in order to determine whether the document has changed from the baseline reference condition. A test value is the output of a hash function that is an integrity verification function that is calculated in order to determine whether the document has changed from the baseline reference condition. The test value is created at a different time or location from a verification standard. A match between a verification standard and a test value is an indication that the corresponding portion of the document is unchanged. In this usage, a different time or location can include any significant difference, no matter how small. In order for a difference to be significant, there need only be a possibility that at least one element of the document could have changed. An integrity decision includes a comparison between verification standards and test values for a document or excerpt of a document. The comparison may be as simple as a check for equality, but could also be more involved. An integrity decision could be either binary, such as "changed versus unchanged," or else diagnostic. A diagnostic decision would attempt to indicate the locations and degrees of changes. As used herein, OCR process is intended to include any process for generating of textual information from graphical information. In some embodiments, generating a modified data sequence from an original or verification data sequence may comprise scrambling the elements according to a deterministic algorithm.

Prior art methods for printing an encrypted code on the face of negotiable documents, such as checks, are described in U.S. Pat. Nos. 6,792,110; 6,549,624; 6,233,340 by Sandru. The methods described by Sandru enable documents to be self authenticating, by encoding certain data in a seal on the face of a check. These prior art methods may be easily distinguished from the current invention.

The methods taught by Sandru require that additional secret information, not found in the document or otherwise discoverable, be used in both the generation and the verification of the encrypted code. Specifically, Sandru's methods employ a secret key cryptographic scheme, which is highly dependent on any variations in the data, to encrypt monetary value information and thereby generate a first control code to be printed on the check. That is, selected information from the check is combined with secret information, not in the document or otherwise ascertainable, to produce a larger data set than the data set that is being protected. This larger data set is encrypted to produce the encrypted code, using a reversible algorithm, i.e., one that allows full recovery of the entirety of the protected information. Thus, Sandru's encrypted code must be long enough to contain all of the information to be verified, plus the additional secret information.

When the check is presented for payment, a validator, such as bank or check clearing house, must employ a verification system having a copy of the encryption key to generate a second control code. The check fails verification if the first and second control codes are not identical. Sandru points out that the encrypted information can only be decoded or validated by a party possessing a key corresponding to the data key necessary to decode or validate the encrypted information. Sandru's method is not tolerant of any document scanning or OCR errors, as is the present invention, but is instead likely to be quite fragile and susceptible to false alarms of document tampering, as described in the previous descriptions of prior art.

Although the invention and its advantages have been described above, it should be understood that various changes, substitutions and alterations can be made herein without departing from the spirit and scope of the claims. Moreover, the scope of the present application is not intended to be limited to the particular embodiments described in the specification. As one of ordinary skill in the art will readily appreciate from the disclosure, alternatives presently existing or later to be developed that perform substantially the same function or achieve substantially the same result as the corresponding embodiments described herein may be utilized according to the invention. Accordingly, the appended claims are intended to include within their scope such alternatives.

What is claimed is:

1. A computer-implemented document integrity verification method comprising:
   receiving a digital document in a word processing format into a computer readable medium;
   generating a first baseline data sequence from the digital document;
   generating a first modified baseline data sequence from the first baseline data sequence in accordance with a set of modification rules, wherein at least one element of the first baseline data sequence, between the first and final elements of the first baseline data sequence, is modified in the first modified baseline data sequence, and wherein an integrity verification code (IVC) generated for the first modified baseline data sequence will differ from an IVC generated for the first baseline data sequence;
   generating a first original IVC, wherein generating a first original IVC comprises performing a one-way operation on the first modified baseline data sequence, and wherein the modification rules render tampering undetectable for the at least one modified element within the first baseline data sequence;
   publishing the digital document with at least a portion of the first original IVC rendered on a face of the published document.

2. The method of claim 1 wherein the published document comprises a document printed on paper.

3. The method of claim 1 wherein rendering the first original IVC on a face of the published document comprises placing at least a portion of the first original IVC in a footer of the document.

4. The method of claim 1 wherein generating a first modified baseline data sequence from the first baseline data sequence comprises omitting elements from the first baseline data sequence so that the first modified baseline data sequence is shorter than the first baseline data sequence.

5. The method of claim 1 wherein modifying an element of the first modified baseline data sequence comprises substituting the element with a different element in the first modified baseline data sequence.

6. The method of claim 1 wherein the modification rules require modification of at least one element which does not correspond to a printed element in the published document.

7. The method of claim 1 wherein the modification rules require that at least one element, which does correspond to a printed element in the printed document, appear in the first modified verification data sequence without modification.

8. The method of claim 1 wherein the modified element comprises a displacement element.

9. The method of claim 1 further comprising:
   generating a second modified baseline data sequence from a subset of the first baseline data sequence which will appear only on a first page of the published document;
   generating a second original IVC, wherein generating a second original IVC comprises performing a one-way operation on the second modified baseline data sequence;
   generating a third modified baseline data sequence from a subset of the first baseline data sequence which will appear only on a second page of the published document;
   generating a third original IVC, wherein generating a third original IVC comprises performing a one-way operation on the third modified baseline data sequence;

rendering at least a portion of the second original IVC on both the first and second pages of the published document; and rendering at least a portion of the third original IVC on both the first and second pages of the published document.

10. The method of claim 1 further comprising:

generating a second modified baseline data sequence from a subset of the first baseline data sequence which will appear only on a first page of the published document;

generating a second original IVC, wherein generating a second original IVC comprises performing a one-way operation on the second modified baseline data sequence;

generating a third modified baseline data sequence from a subset of the first baseline data sequence which will appear on multiple pages of the published document;

generating a third original IVC, wherein generating a third original IVC comprises performing a one-way operation on the third modified baseline data sequence;

rendering at least a portion of the second original IVC on the first page of the published document; and rendering at least a portion of the third original IVC on the first page of the published document.

11. The method of claim 10 wherein the third modified baseline data sequence comprises a subset of the first baseline data sequence which will appear only on pages of the published document that are prior to the first page and include the first page.

12. The method of claim 10 wherein the third modified baseline data sequence comprises a subset of the first baseline data sequence which will appear only on pages of the published document that are prior to the first page and does not include the first page.

13. The method of claim 10 wherein the third modified baseline data sequence comprises a subset of the first baseline data sequence which will appear only on pages of the published document that are subsequent to the first page and include the first page.

14. The method of claim 10 wherein the third modified baseline data sequence comprises a subset of the first baseline data sequence which will appear only on pages of the published document that are subsequent to the first page and does not include the first page.

15. The method of claim 1 wherein the published document comprises a portable document format (PDF) document.

16. The method of claim 1 further comprising:

transmitting the first original IVC across a public computer network to a remote database node.

17. A computer program embodied on a computer executable medium and configured to be executed by a processor, the program comprising:

code for receiving a digital document in a word processing format into a computer readable medium;

code for generating a first baseline data sequence from the digital document;

code for generating a first modified baseline data sequence from the first baseline data sequence in accordance with a set of modification rules, wherein at least one element of the first baseline data sequence, between the first and final elements of the first baseline data sequence, is modified in the first modified baseline data sequence, and wherein an integrity verification code (IVC) generated for the first modified baseline data sequence will differ from an IVC generated for the first baseline data sequence;

code for generating a first original IVC, wherein generating a first original IVC comprises performing a one-way operation on the first modified baseline data sequence, and wherein the modification rules render tampering undetectable for the at least one modified element within the first baseline data sequence;

code for printing the digital document with at least a portion of the first original IVC rendered on a face of the published document.

18. The program of claim 17 further comprising:

code for generating a second modified baseline data sequence from a subset of the first baseline data sequence which will appear only on a first page of the published document;

code for generating a second original IVC, wherein generating a second original IVC comprises performing a one-way operation on the second modified baseline data sequence;

code for generating a third modified baseline data sequence from a subset of the first baseline data sequence which, wherein the third baseline data sequence does not overlap with the second modified baseline data sequence;

generating a third original IVC, wherein generating a third original IVC comprises performing a one-way operation on the third modified baseline data sequence;

rendering at least a portion of the second original IVC on the first page of the published document; and rendering at least a portion of the third original IVC on the first page of the published document.

19. The program of claim 17 further comprising:

code for transmitting the first original IVC across a public computer network to a remote database node.

20. A computer-implemented document integrity verification method comprising:

receiving a digital document in a word processing format into a computer readable medium;

generating a first baseline data sequence from the digital document;

generating a first modified baseline data sequence from the first baseline data sequence in accordance with a set of modification rules, wherein at least one element of the first baseline data sequence, between the first and final elements of the first baseline data sequence, is modified in the first modified baseline data sequence, and wherein an integrity verification code (IVC) generated for the first modified baseline data sequence will differ from an IVC generated for the first baseline data sequence;

generating an original IVC, wherein generating an original IVC comprises performing a one-way operation on the first modified baseline data sequence, and wherein the modification rules render tampering undetectable for the at least one modified element within the first baseline data sequence;

transmitting the original IVC across a public computer network to a remote database node.

* * * * *